United States Patent [19]

Ochiai et al.

[11] Patent Number: 5,647,042
[45] Date of Patent: Jul. 8, 1997

[54] OPTICAL LINK MODULE CONNECTION SYSTEM

[75] Inventors: Ryoichi Ochiai; Kazunori Miura; Seimi Sasaki; Goji Nakagawa, all of Kawasaki, Japan

[73] Assignee: Fujitsu Limited, Kanagawa, Japan

[21] Appl. No.: 613,001

[22] Filed: Mar. 8, 1996

[30] Foreign Application Priority Data

Jul. 5, 1995 [JP] Japan .................................... 7-169832

[51] Int. Cl.⁶ .................................................. G02B 6/38
[52] U.S. Cl. ........................ 385/56; 385/60; 385/88; 385/92
[58] Field of Search ............................ 385/15, 24, 53, 385/55, 56, 60, 70, 72, 76, 77, 78, 88, 92, 93, 94, 134, 139

[56] References Cited

U.S. PATENT DOCUMENTS

| | | | |
|---|---|---|---|
| 4,756,593 | 7/1988 | Koakutsu et al. | 385/139 |
| 5,347,604 | 9/1994 | Go et al. | 385/92 |
| 5,504,826 | 4/1996 | Shibutani et al. | 385/24 |
| 5,511,140 | 4/1996 | Cina et al. | 385/93 |
| 5,579,426 | 11/1996 | Li et al. | 385/88 |

*Primary Examiner*—John D. Lee
*Attorney, Agent, or Firm*—Helfgott & Karas, P.C.

[57] ABSTRACT

An optical link module connection system for connecting an optical fiber to an optical link module that performs conversion between an electrical signal and an optical signal. The system is aimed at reduction of the manufacturing cost of printed circuit boards containing those fiber-optic products by allowing an automated soldering process to be applied thereto. The system will also facilitate the product handling as well as storage and improve the board space utilization by shortening the length of the optical fiber. While optoelectronic conversion means comprises a first ferrule, coupling means consists of a second ferrule, a split sleeve, etc. The first ferrule is inserted into the split sleeve in the coupling means so as to contact the second ferrule, thus completing an optical path between a first optical fiber and a second optical fiber. The optoelectronic conversion means will be soldered to a printed circuit board before being joined to the coupling means. That is, when soldering the printed circuit board, the second optical fiber having only a poor heat resistance is not yet mounted on the board, thus allowing automated soldering equipment to be used for the process.

17 Claims, 41 Drawing Sheets

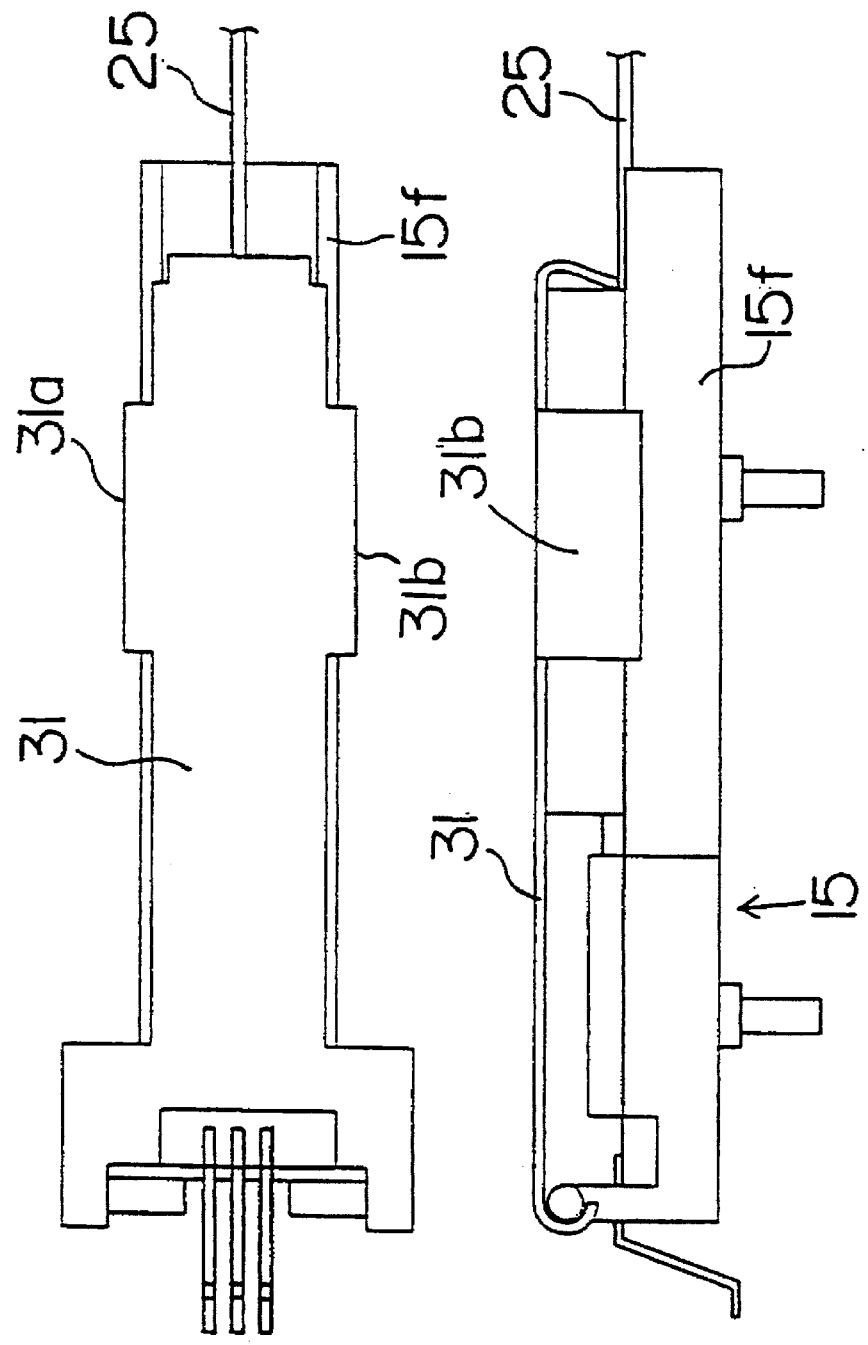

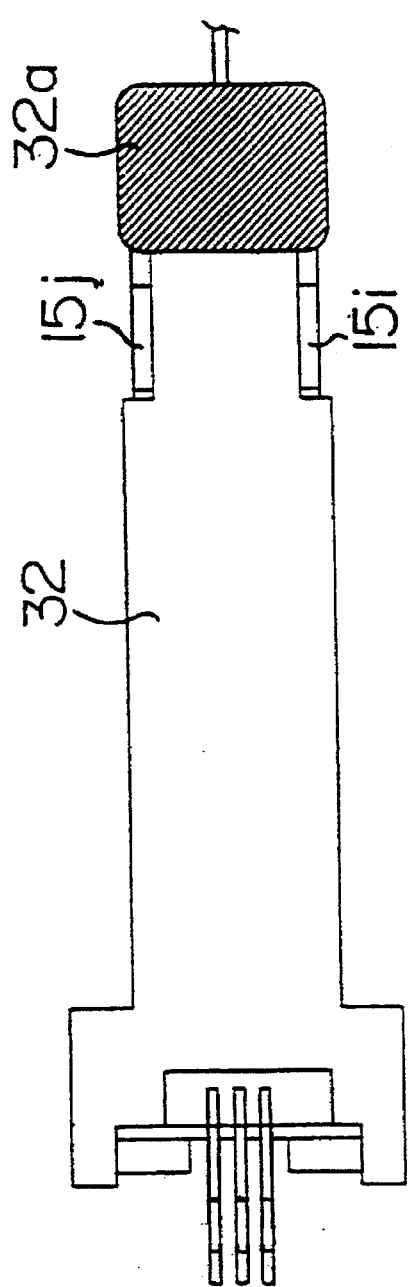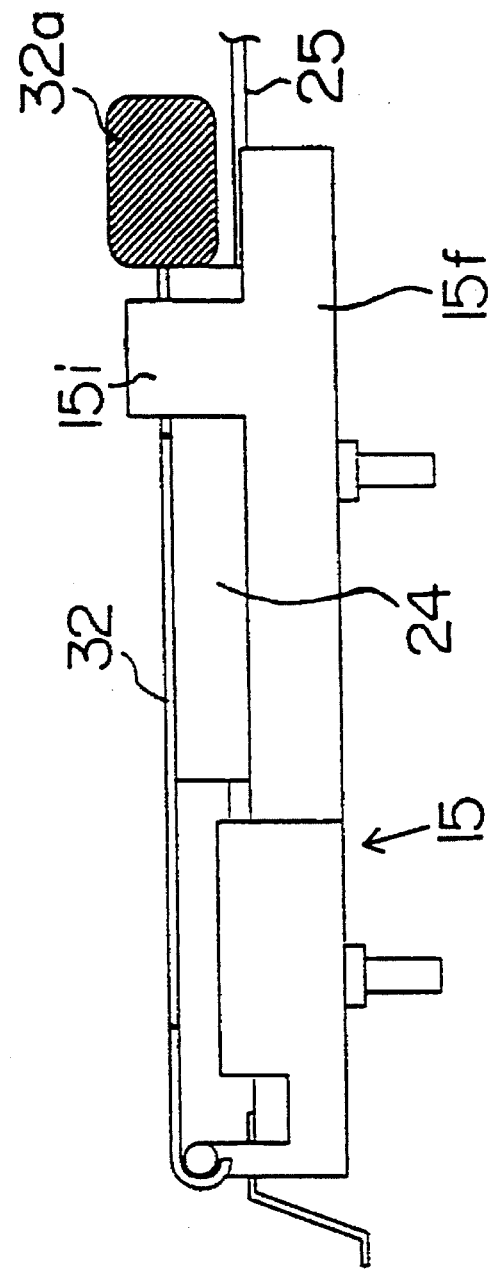
FIG. 19(A)
FIG. 19(B)

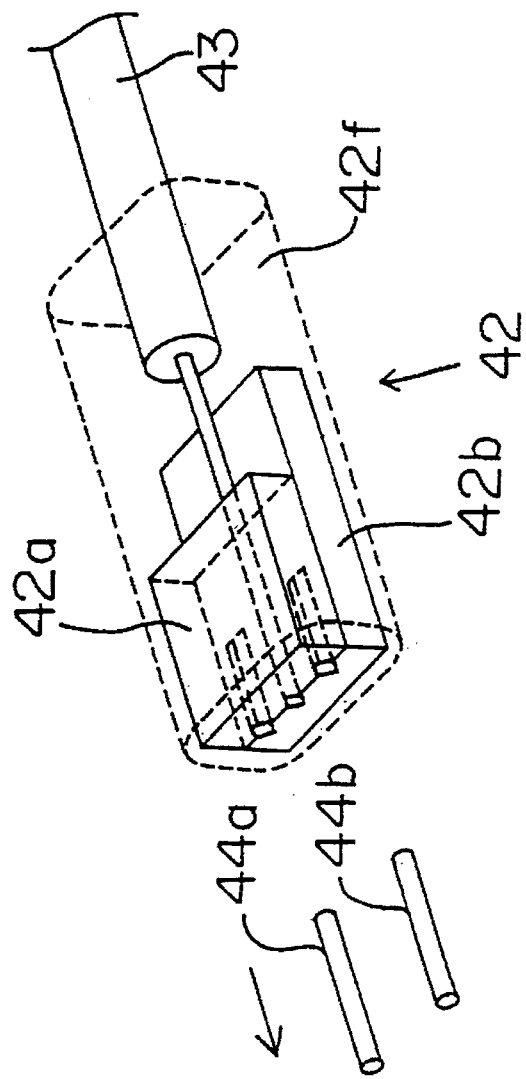
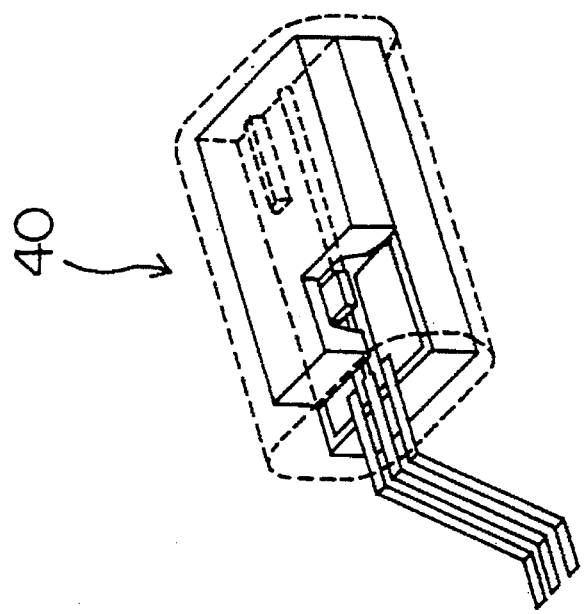
FIG. 26

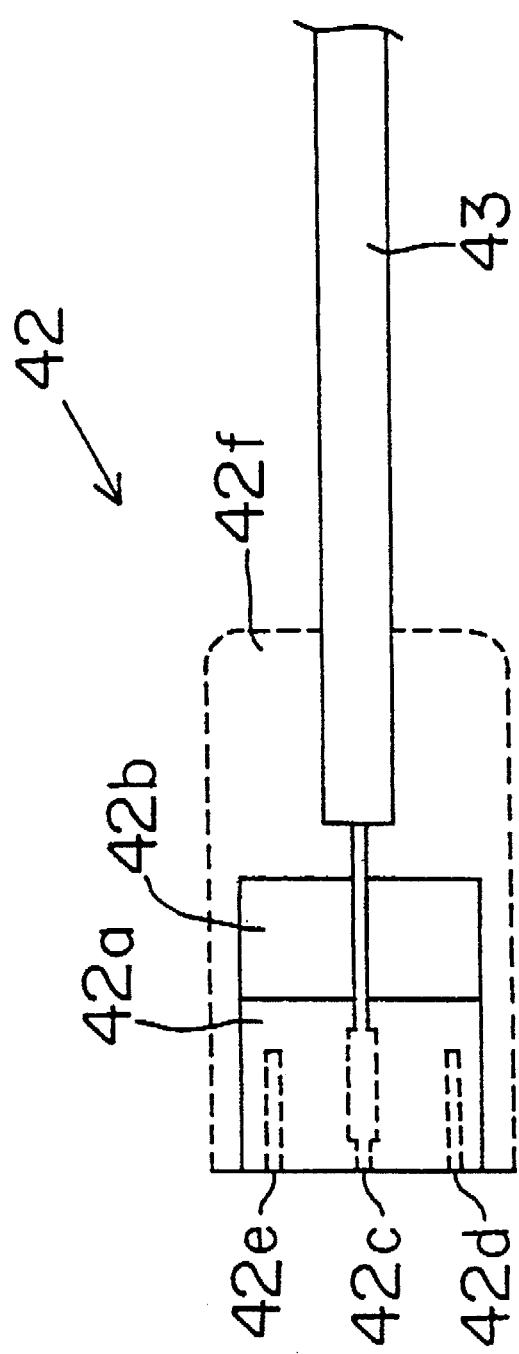
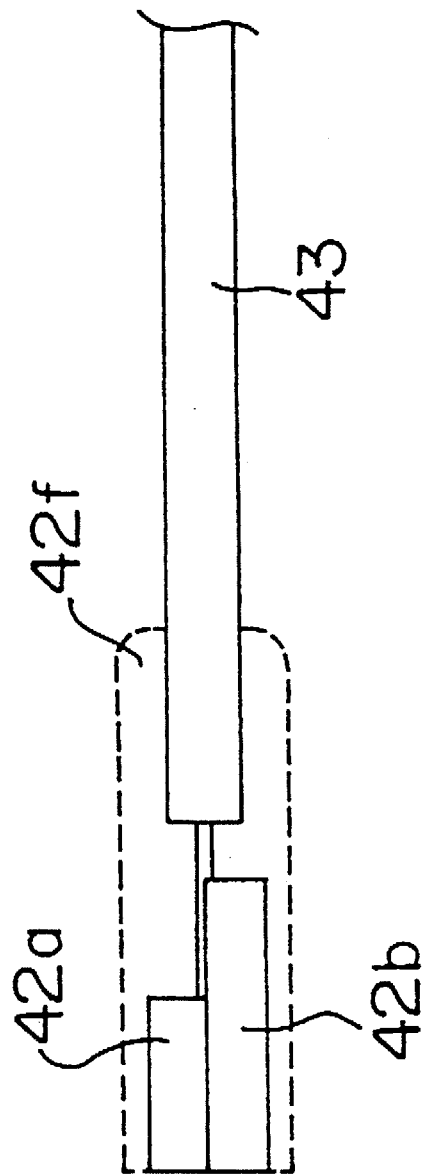
FIG. 27(A)
FIG. 27(B)

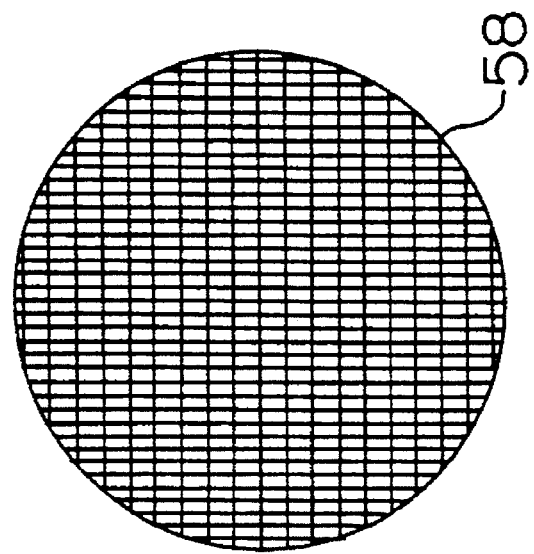
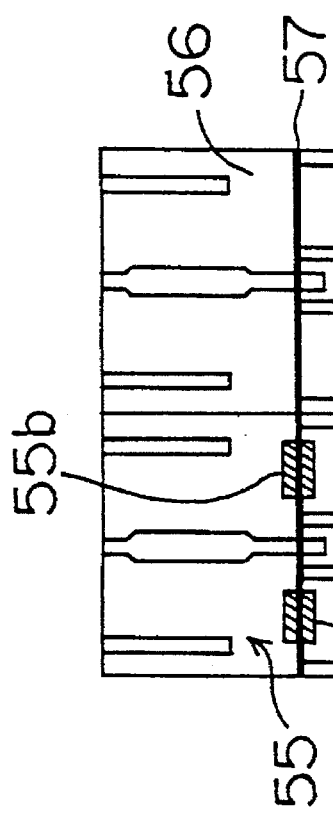
FIG. 33(A)
FIG. 33(B)
FIG. 33(C)

OPTICAL LINK MODULE CONNECTION SYSTEM

BACKGROUND OF THE INVENTION

1. Field of the Invention

The present invention relates to an optical link module connection system, and more specifically, to an optical link module connection system for connecting an optical fiber to an optical link module which converts an optical signal to an electrical signal or vice versa.

2. Description of the Related Art

In the United States, the information superhighway is now becoming a reality. As a similar project in Japan, a fiber-optic network targeted to all subscribers is planned to be developed by 2010. The present invention will be applied to optoelectronic converters that must be one of the key devices in optical link equipment to be used by the subscribers in this project.

Optoelectronic converters, called optical link modules in general, are supplied by communications equipment manufacturers and the like, whose average production scale per supplier is presently about 100,000 modules a year. However, it is said that the fiber-optic network covering all subscribers will require a larger production scale of one million or more modules per year and intensive efforts to reduce the cost to less than 10% of the current cost. The present invention is intended to meet these challenging requirements.

FIGS. 38(A) and 38(B) are a plan and side views, respectively, showing a conventional optical link module that has a connection to an optical fiber. The optical link module shown in those figures is a pigtail type module, which is composed of an optical link module 101, an optical fiber 102 of 1–2 m in length extended therefrom, and a standard optical fiber connector 103 connected to an end of the fiber. The standard optical fiber connector 103 may be the SC connector, for example, to provide a fiber-to-fiber junction to another optical fiber cable equipped with a mating connector of the same standard.

Devices to be mounted on printed circuit boards (hereafter "PC boards") used in communications equipment are classified into the following two types in terms of mounting methods: surface mount devices and through-hole mount devices (or pin-in-hole mount devices). One of the common packages of surface mount devices is the flat pack which is often used for packaging LSIs. To mount this type of devices, a soldering process called "reflow soldering" is used as in the following sequence: printing solder paste on a bare PC board; placing surface mount devices on the printed solder paste; and soldering them on a conveyer moving through an oven heated up so that the surface temperature of the components will be 220° C. or more.

On the other hand, large capacitors and LSIs provided in pin grid array (PGA) packages having many terminals over 200 pins are typical through-hole mount devices that will be mounted by using "flow soldering" techniques. That is, the leads of those devices are inserted in the through-holes bored on the PC board, and the underside (i.e., the side opposite to the component side) is then put on a solder bath that delivers molten solder heated up to about 260° C. During the process of flow soldering, the temperature on the component side rises up to about 150° C.

Since such surface mount devices and through-hole mount devices are mixedly mounted on the same PC boards for communication equipment, a typical factory process of automatic soldering proceeds as shown in FIGS. 39(A) to 39(E). That is, as in the sequence indicated by the subindices of the drawings, the process comprises the following steps of: (A) printing solder paste; (B) placing surface mount devices on predetermined places by using adhesion of the solder paste applied thereto; (C) applying a reflow soldering; (D) inserting the leads of through-hole mount devices into the through-holes in the predetermined places; and (E) applying a flow soldering.

In general, the optical fiber 102 extended from the optical link module 101 is coated with nylon, for example, to protect the fiber from scratches. Such coating, however, has poor heat resistance as low as 80° C. and thus would melt in a high temperature in the above-described automated soldering process. Due to such temperature constraints, the optical link module 101 must be manually soldered to the PC board (cf. FIG. 40(B)) after the fellow and flow soldering processes have all finished for mounting the other components (cf. FIG. 40(A)). This exceptional work in the board assembly process will raise the manufacturing cost of the equipment.

Further, when connecting the optical fiber 102 to the optical link module 101, their optical axes must be properly aligned with each other. If it was unable to obtain a proper alignment in the first trial, the connection should be retried after cutting off a predetermined length at the end of the optical fiber 102. In preparation for this retry processing, the optical fiber 102 has an extra length that may be cut off later. Because of another requirement of minimum bending radius of 30 mm, the optical fiber 102 finally reaches 1–2 m in total length and its excessive portion is coiled up for storage. This long optical fiber is so bulky that it causes a problem with storage space and handling in the shop floor.

Lastly, the optical fiber 102 are coiled and stacked up on the PC board as shown in FIG. 41, and it also degrades the utilization factor of board space, leaving little space for mounting other parts.

SUMMARY OF THE INVENTION

Taking the above into consideration, a first object of the present invention is to provide an optical link module connection system which allows an automated soldering process to be applied thereto in order to reduce the manufacturing cost.

A second object of the present invention is to provide an optical link module connection system which shortens the length of the optical fiber and facilitates its storage and handling as well as improving the space utilization factor of the PC board to mount more other components on it.

To accomplish the above objects, there is provided an optical link module connection system for connecting an optical fiber to an optical link module which performs conversion between an optical signal and an electrical signal. This system comprises three elements as follows.

The first element is optoelectronic conversion means for performing an optoelectronic conversion, provided with a first ferrule having a first optical fiber packaged therein. The second is coupling means, which is located at one end of a second optical fiber and has a second ferrule to package the second optical fiber therein, for optically coupling the second optical fiber with the first optical fiber by locating an endface of the second ferrule opposite to an endface of the first ferrule. The third is a standard optical fiber connector assembled at the other end of the second optical fiber.

Further, to accomplish the above objects, there is provided another optical link module connection system for connecting an optical fiber to an optical link module which performs conversion between an optical signal and an electrical signal. This system comprises the following three elements.

The first element is optoelectronic conversion means which performs an optoelectronic conversion and has a first interface surface, on which a first endface of a first optical fiber is exposed. The second is coupling means, provided at an end of a second optical fiber, for providing an optical path between the second optical fiber and the first optical fiber. This coupling means has a second interface surface facing the first interface surface, on which a second endface of the second optical fiber is exposed, and positioning means on the second interface surface for locating the second interface surface so that the second endface will face the first endface. The third and last element is a standard optical fiber connector assembled at the other end of the second optical fiber.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 18(A) and 18(B) are diagrams showing the structure of a second variation of the metal plate spring;

FIGS. 19(A) and 19(B) are diagrams showing the structure of a third variation of the metal plate spring;

FIG. 26 is a diagram showing how to connect the optical link module with a terminal;

FIGS. 27(A) and 27(B) are diagrams showing the structure of the terminal;

FIGS. 33(A), 33(B), and 33(C) are diagrams showing how to process the silicon substrate;

DESCRIPTION OF THE PREFERRED EMBODIMENTS

Several embodiments of the present invention will be described below with reference to the drawings.

Figure 1:
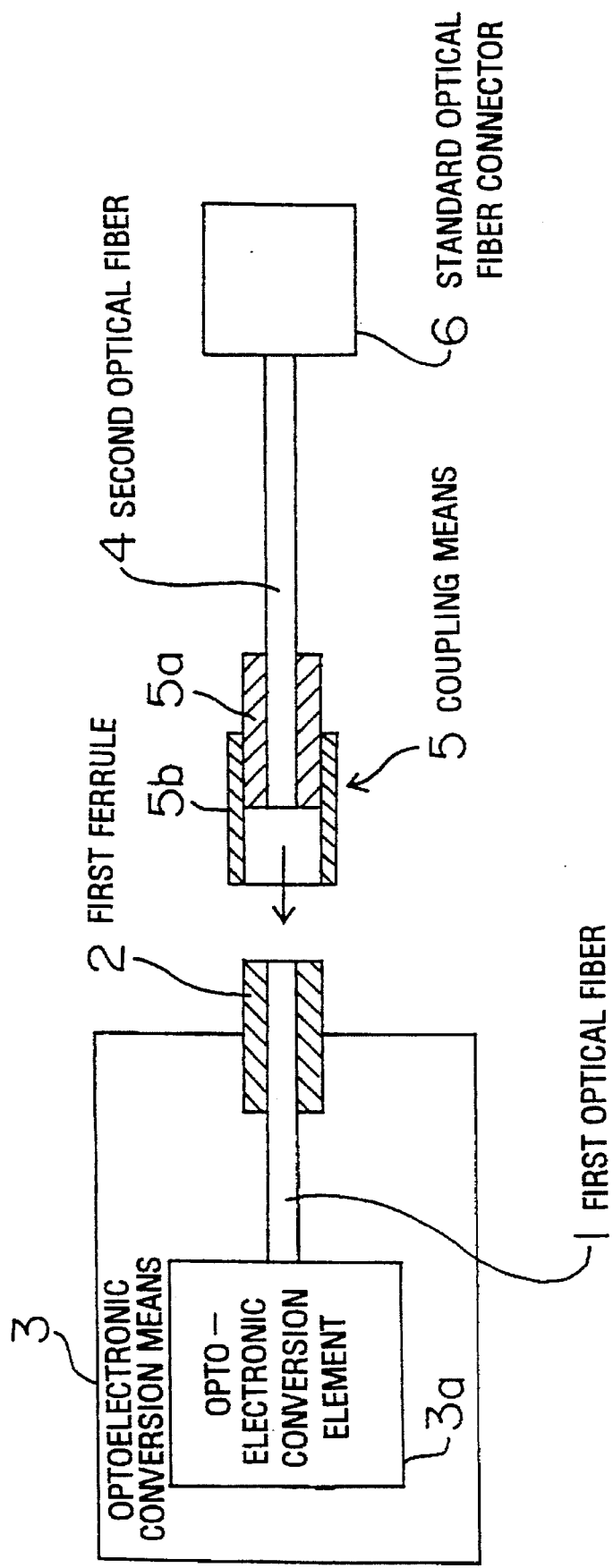
FIG. 1 is a first conceptual view of the present invention.

At the outset, principle of a first embodiment of the present invention will be presented with reference to FIG. 1. The first embodiment is mainly constructed with three elements. The first element is optoelectronic conversion means 3 for converting an electric signal to an optical signal or vice versa, which is equipped with a first ferrule 2 having a first optical fiber 1 packaged therein. The second element is coupling means 5 provided at one end of a second optical fiber 4. This coupling means has a second ferrule 5a to package the second optical fiber 4 and couples the first optical fiber 1 with the second optical fiber 4 by making the endface of the first ferrule 2 face the endface of the second ferrule 5a. The third element is a standard optical fiber connector 6 is attached to the other end of the second optical fiber 4. The more details of these elements will be explained below with reference to FIGS. 3 to 15.

Figure 3:
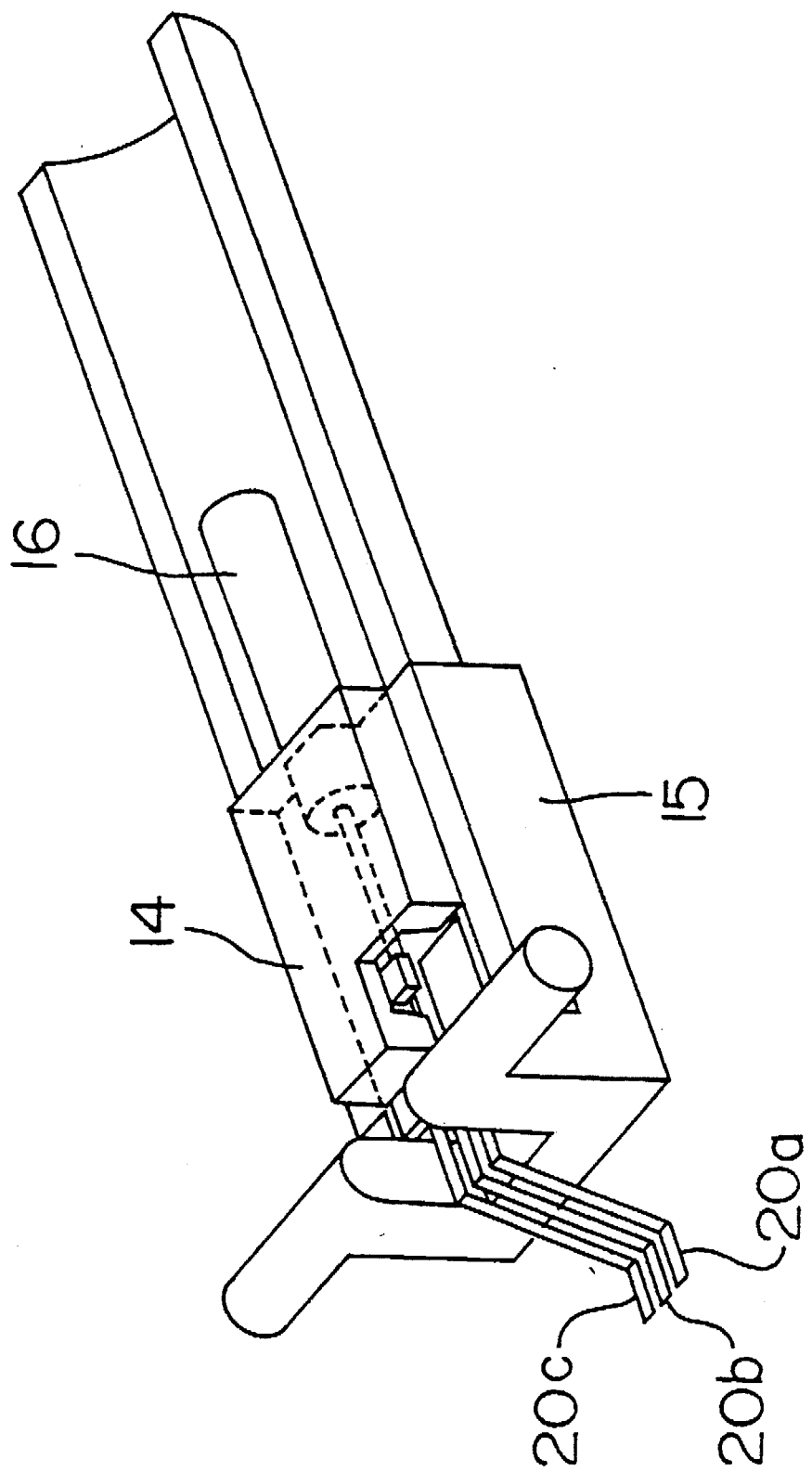
FIG. 3 is a diagram showing the structure of optoelectronic conversion means in a first embodiment.

FIG. 3 is an isometric view showing a specific structure of the optoelectronic conversion means 3. The optoelectronic conversion means 3 is composed of an optical link module 14 for converting, for example, an electrical signal to an optical signal, a housing 15 for housing the optical link module 14, a ferrule 16 to be attached to the optical link module 14, and the like. Leads 20a, 20b, and 20c of the optical link module 14 are connected to the PC board (not shown), and the ferrule 16 accepts a terminal as will be explained later on.

Figure 4:
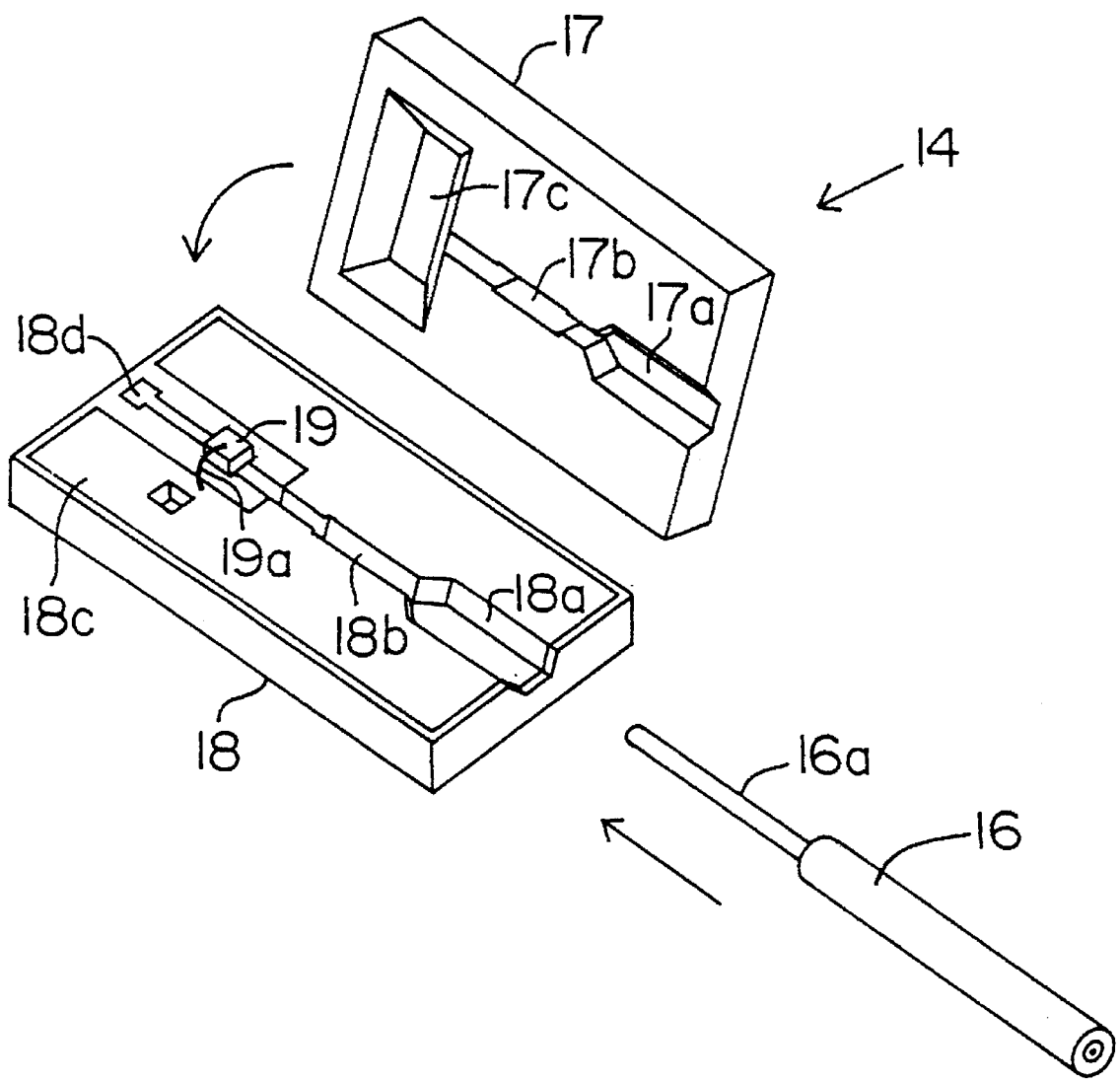
FIGS. 4 and 5 are assembly diagrams showing the optical link module.
Figure 5:
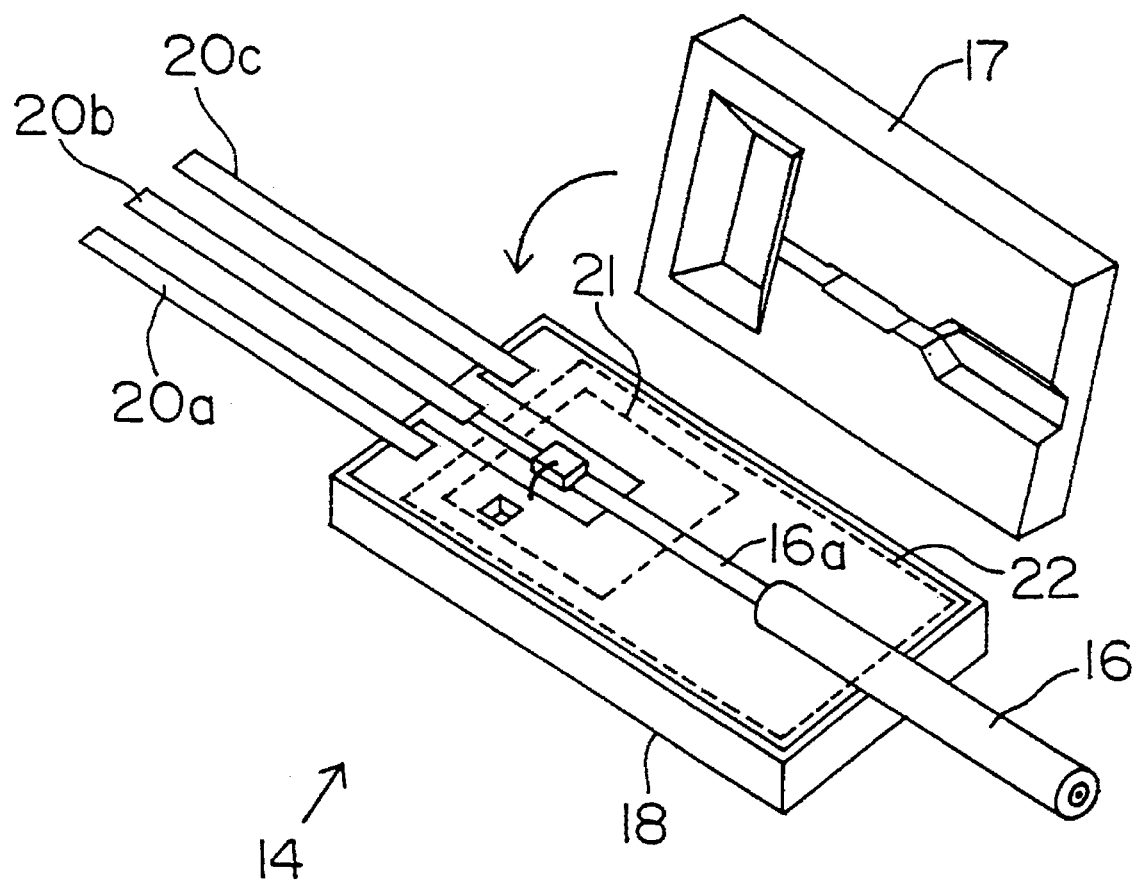

FIGS. 4 and 5 show the structure of the optical link module 14 and how to assemble it. The explanation will start with the structure shown in FIG. 4.

The optical link module 14 is composed of two silicon substrates 17 and 18 made of silicon and a laser diode (LD)

19 held between them. The ferrule 16, which packages an optical fiber stub 16a into its center hole, is also held between the silicon substrates 17 and 18. Material of the ferrule 16 may be selected from ceramics, metals, or glasses. The laser diode 19 corresponds to the optoelectronic conversion element 3a in FIG. 1, and similarly, the ferrule 16 and optical fiber stub 16a correspond to the first ferrule 2 and first optical fiber 1, respectively.

The optical fiber stub 16a is extruded at an end of the ferrule 16, and its endface at the other end is level with that of the ferrule 16. Incidentally, this optical fiber stub 16a has no coating. While the lower silicon substrate 18 has a V-groove 18a to house the ferrule 16 and another V-groove 18b to hold the extruded optical fiber stub 16a, the upper silicon substrate 17 has two V-grooves 17a and 17b opposite to the grooves 18a and 18b on the lower silicon substrate 18. A cavity 17c is engraved also on the upper silicon substrate 17 for housing the laser diode 19.

A negative metal contact layer 18c and a positive metal contact layer 18d are formed on the lower silicon substrate 18, where the negative electrode of the laser diode 19 is connected to the negative metal contact layer 18c via a flying lead 19a and the positive electrode is bonded to the positive metal contact layer 18d. Then, the leads 20a, 20b, and 20c are connected to the negative metal contact layer 18c, positive metal contact layer 18d and negative metal contact layer 18c, respectively, as illustrated in FIG. 5. The optical fiber stub 16a and ferrule 16 are placed in the respective V-grooves on the lower silicon substrate 18 so that the tip of the optical fiber stub 16a will face the light spot of the laser diode 19. After that, some amount of thermosetting resin adhesive is applied to an area between two closed broken lines 21 and 22, and the upper silicon substrate 17 is put onto there for fixation. Additional adhesives are then injected into a gap between the ferrule 16 and the silicon substrates 17 and 18 to fix the ferrule 16. That concludes the assembly procedure of the optical link module 14, wherein the laser diode 19 is sealed up and the ferrule 16 is fixed to the body of the module. Optionally, the outside of the optical link module 14 may be further molded with plastics.

Figure 6:
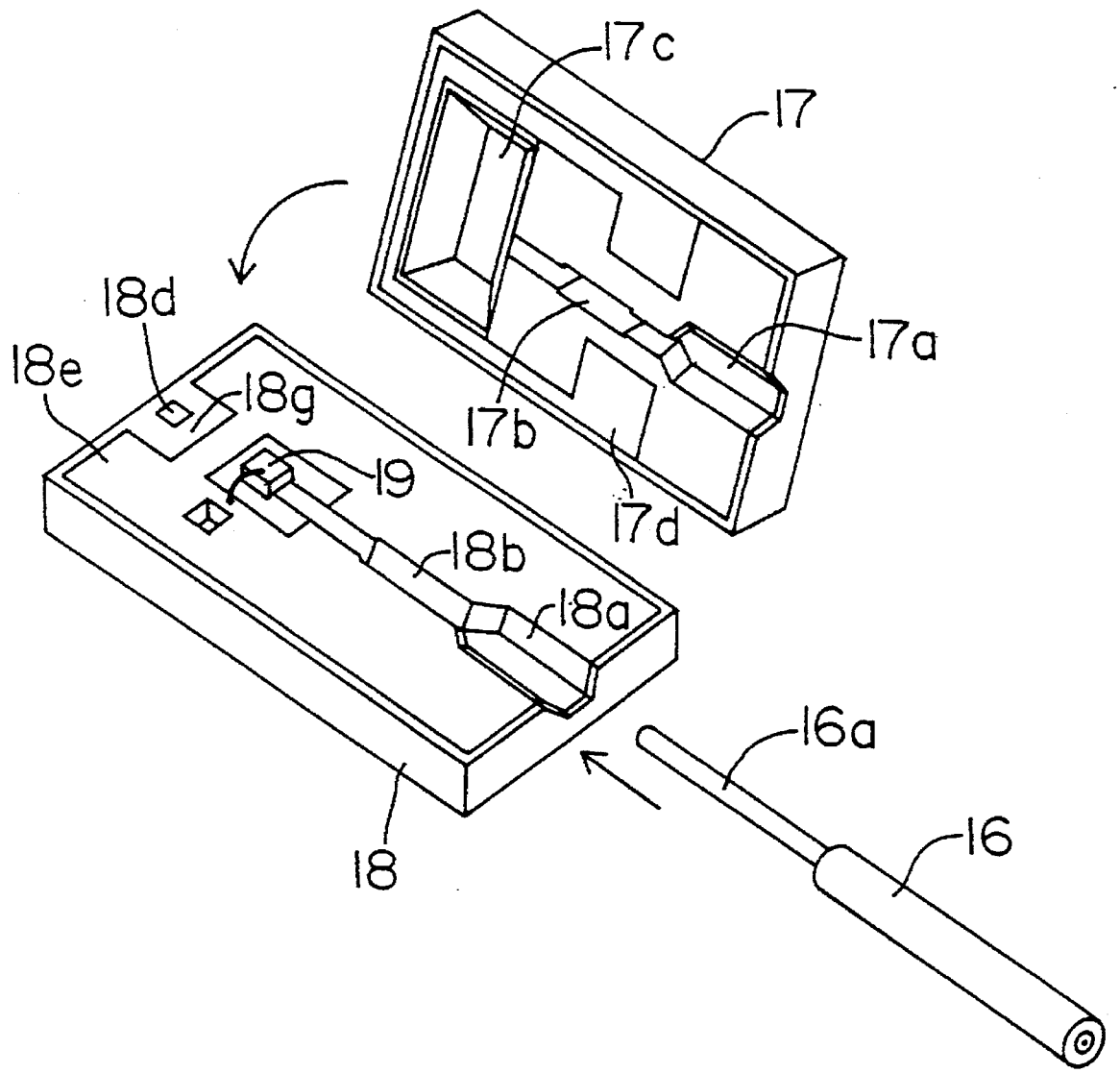
FIGS. 6 and 7 are another set of assembly diagrams showing the optical link module.
Figure 7:
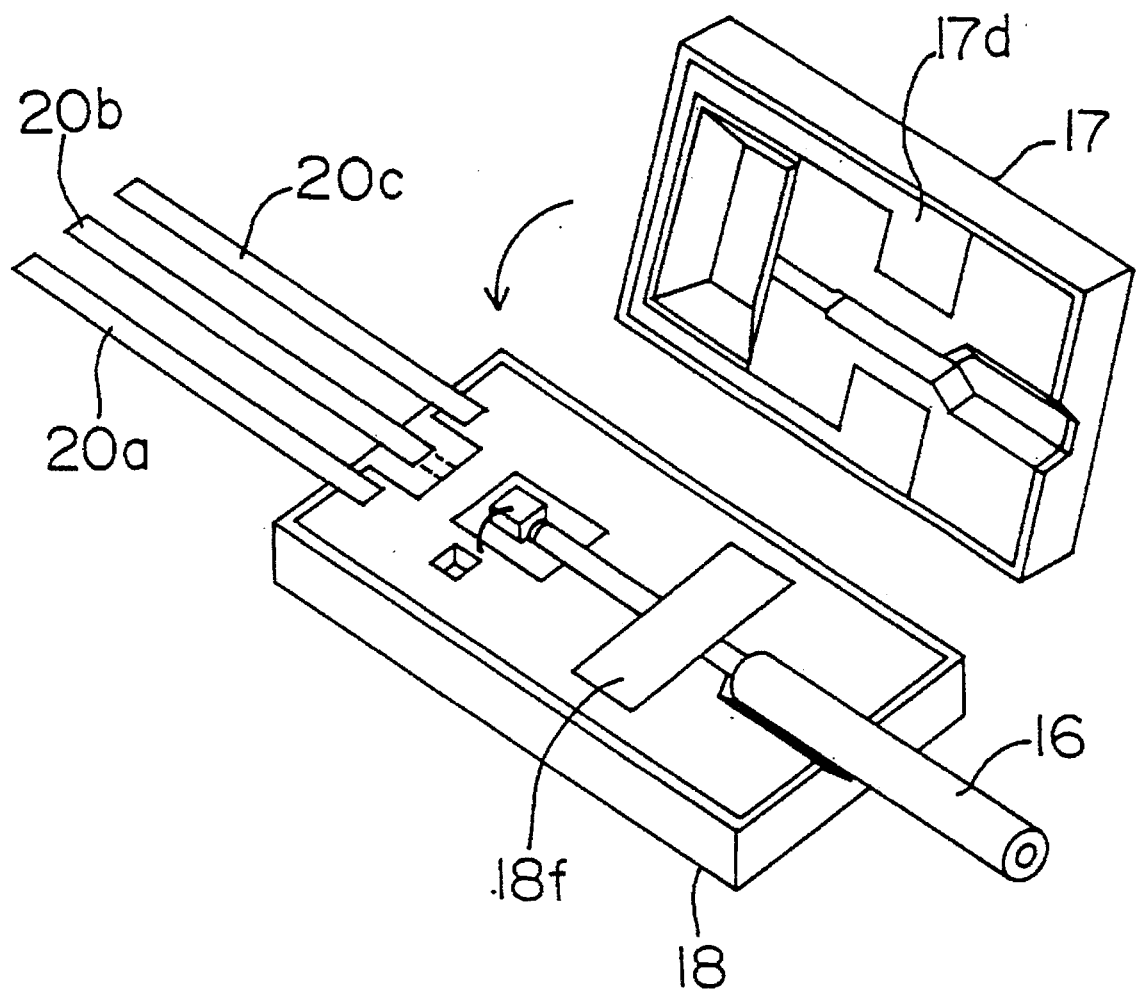

FIGS. 6 and 7 show another type of structure of the optical link module and its assembly procedure. Note that the following description will not mention some elements commonly shown in FIGS. 4 or 5, while maintaining their consistent reference numerals. In this optical link module, there is provided an insulation layer 18g on the positive metal contact layer 18d, and a negative metal contact layer 18e is further formed thereon. Two openings of the insulation layer 18g allow the laser diode 19 and the lead 20b to be electrically connected to the positive metal contact layer 18d. The ferrule 16 and the optical fiber stub 16a are placed in the respective V-grooves on the lower silicon substrate 18, and then a solder sheet 18f is put on it as illustrated in FIG. 7. The upper silicon substrate 17, which has a solder coating 17d formed beforehand as shown in FIG. 6, finally covers the lower silicon substrate 18, and these two substrates are pressed and heated for bonding. The optical link module is thereby assembled, having the laser diode 19 completely sealed therein and the ferrule 16 fixed to the body.

Figure 8:
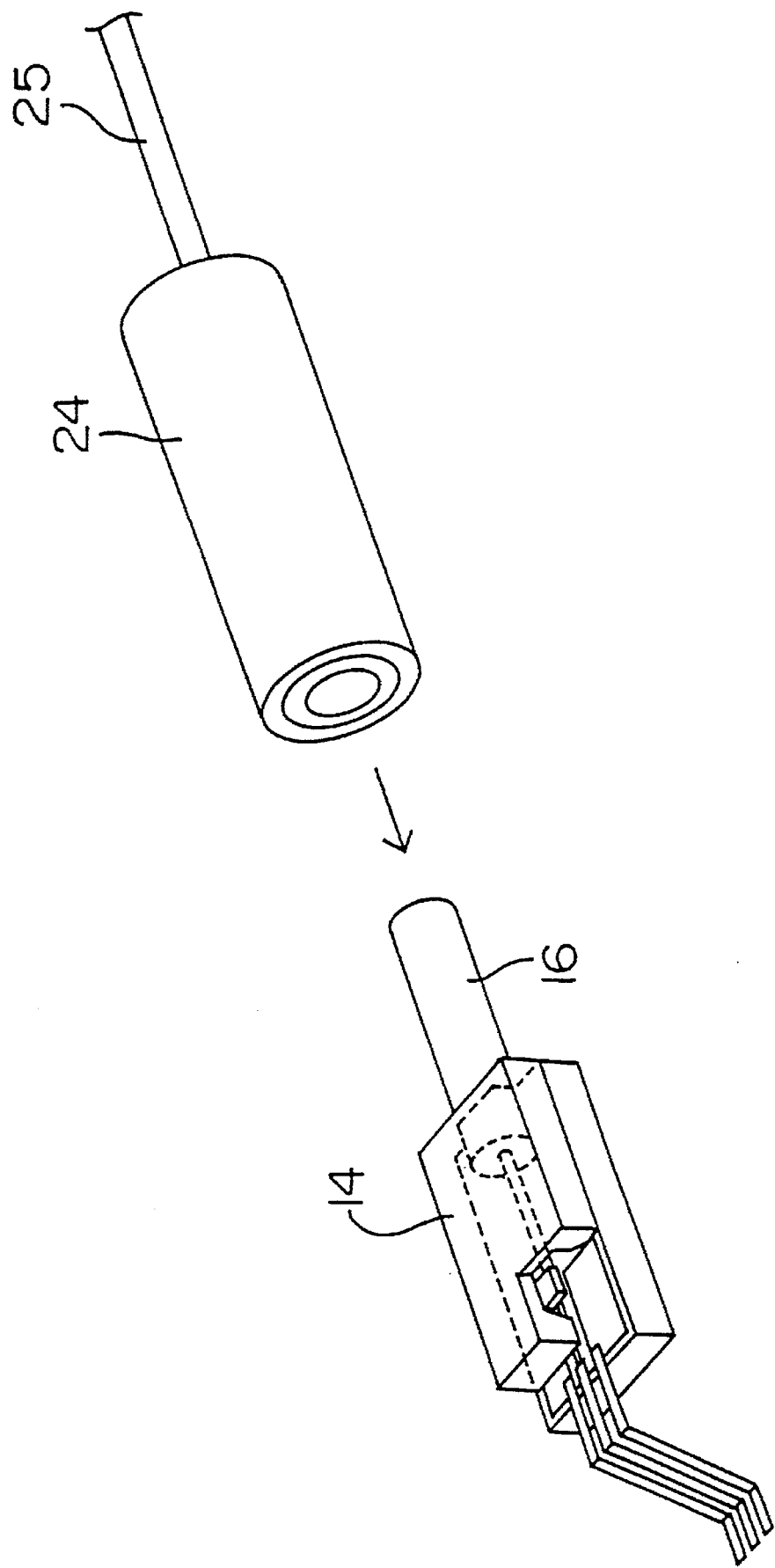
FIG. 8 is a diagram showing the connection between the optical link module and a terminal.

FIG. 8 shows how the optical link module 14 assembled as above can be used to connect an optical fiber 25, where the ferrule 16 mates with a terminal 24 attached to the end of the fiber. Here, the terminal 24 and optical fiber 25 are what are shown in FIG. 1 as the coupling means 5 and the second optical fiber 4, respectively.

Figure 9A:
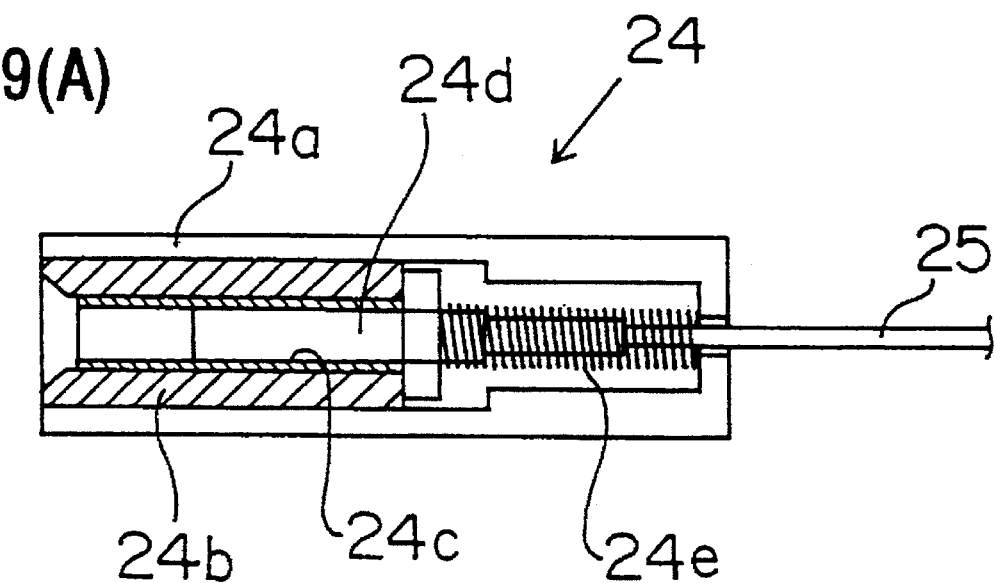
FIGS. 9(A) and 9(B) are diagrams showing the structure of the terminal which serves as coupling means in the first embodiment.
Figure 9B:
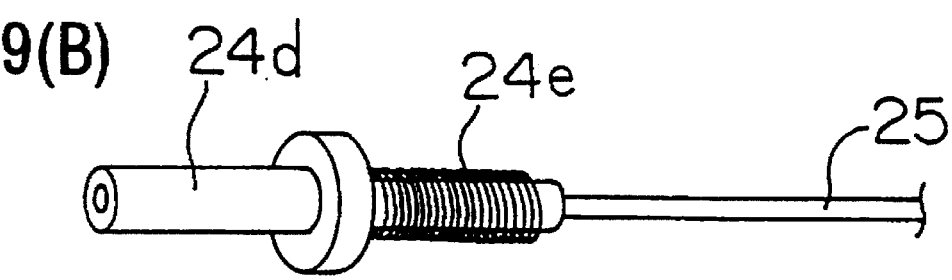

FIGS. 9(A) and 9(B) show the structure of the terminal 24, and specifically, FIG. 9(A) is a section view of the terminal 24 and FIG. 9(B) is an isometric view of a ferrule and other elements housed therein. The terminal 24 is composed of a cylindrical housing 24a made of steel, a sleeve holder 24b molded with plastics, a split sleeve (or a C-shaped sleeve) 24c made of phosphor bronze, a ferrule 24d with a flange, and a helical spring 24e. The optical fiber 25 runs through the center hole of the ferrule 24d, and its endface appears at one end of the ferrule 24d as being level with that endface of the ferrule 24d. Covered with a nylon coating for protection, the optical fiber 25 extends from the other end of the ferrule 24d and is terminated with a standard optical fiber connector (not shown).

While the sleeve holder 24b holding the split sleeve 24c is fixed to the housing 24a, the helical spring 24e pushes the ferrule 24d in the left direction as shown in FIGS. 9(A) and 9(B) until the flange touches the sleeve holder 24b. The ferrule 16 of the optical link module 14 will be inserted into the split sleeve 24c and stop at a position where it slightly displaces the ferrule 24d to the right direction of FIG. 9(A). This configuration can keep the ferrule 16 in contact with the ferrule 24d using the pressure of the helical spring 24e.

Figure 10:
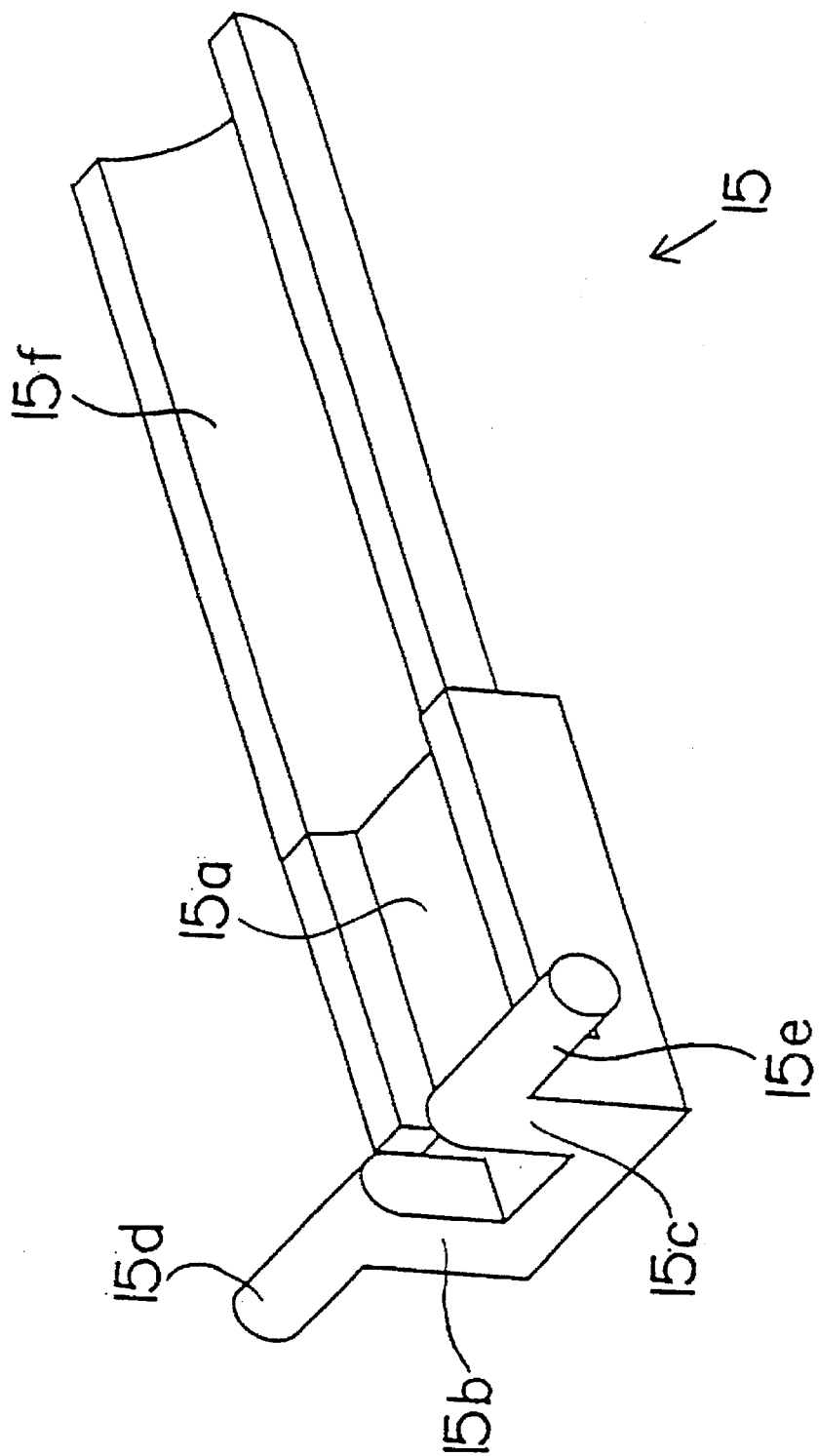
FIG. 10 is a diagram showing the structure of a housing.
Figure 11:
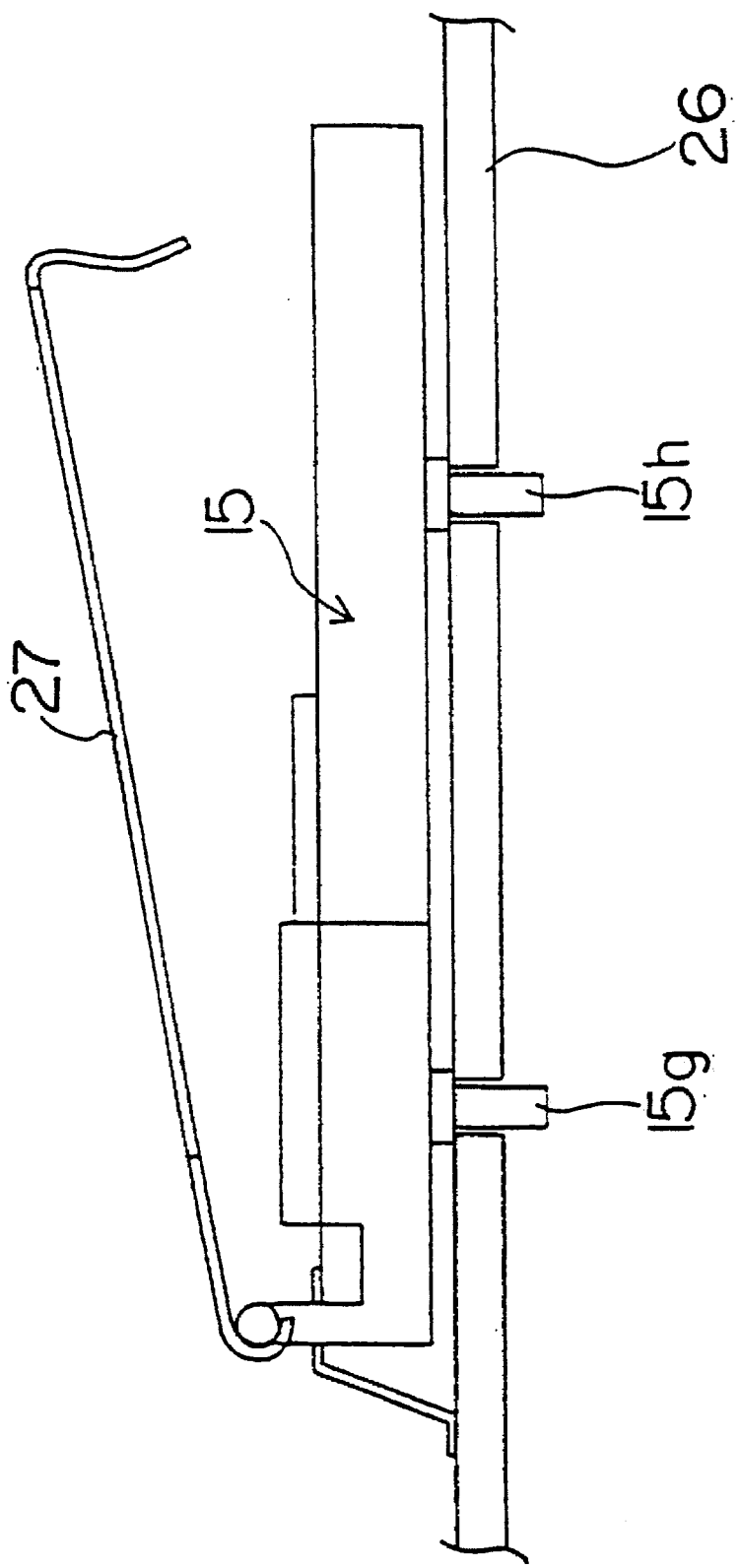
FIG. 11 is a side view of the housing.

FIG. 10 is an isometric view showing the structure of the housing 15. That is, the housing 15 has the following distinctive portions: a mounting space 15a on which the optical link module 14 will be bonded with a silicon adhesive; a walls 15b and 15c against which the optical link module 14 will be pressed for positioning; projections 15d and 15e where a metal plate spring (to be described later) will be hooked, and a ferrule guide 15f which will guide the terminal 24 during its insertion. The housing 15 is made of steel, for example, and plated with nickel. The ferrule guide 15f has a round groove engraved so that it will fit to the cylindrical housing 24a of the terminal 24. Further, the housing 15 has two solder-plated legs 15g and 15h, as shown in FIG. 11, to be inserted and soldered to the PC board 26 in a flow soldering process.

Figure 12:
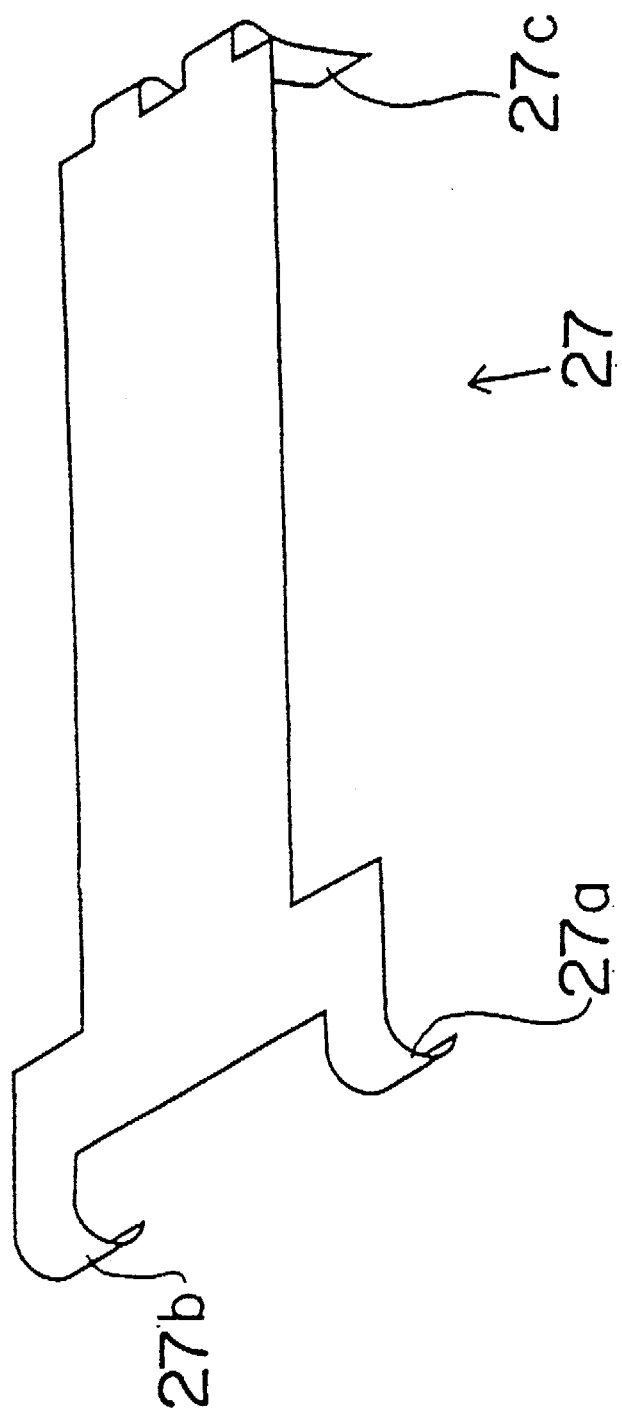
FIG. 12 is a diagram showing the structure of a metal plate spring.

FIG. 12 shows the structure of a metal plate spring 27. This metal plate spring 27, made of stainless steel, has hooks 27a and 27b to hook on the projections 15d and 15e of the housing 15 and another hook 27c to latch the terminal 24. The metal plate spring 27 can pivot on the hooks 27a and 27b. The hook 27c latches the terminal 24, preventing it from falling off from the ferrule 16.

The next explanation devotes to the procedure of mounting the above-described components on a PC board for electrical interconnection.

The procedure starts with fixation of the optical link module 14 to the housing 15 by using a silicon adhesive (FIG. 3). The housing 15 is then mounted on the PC board 26 and directed to flow soldering (FIG. 11). The optical link module 14 is tolerant of high temperature in the flow soldering, because the optical fiber stub 16a integrated therein has no coating.

Figure 13:
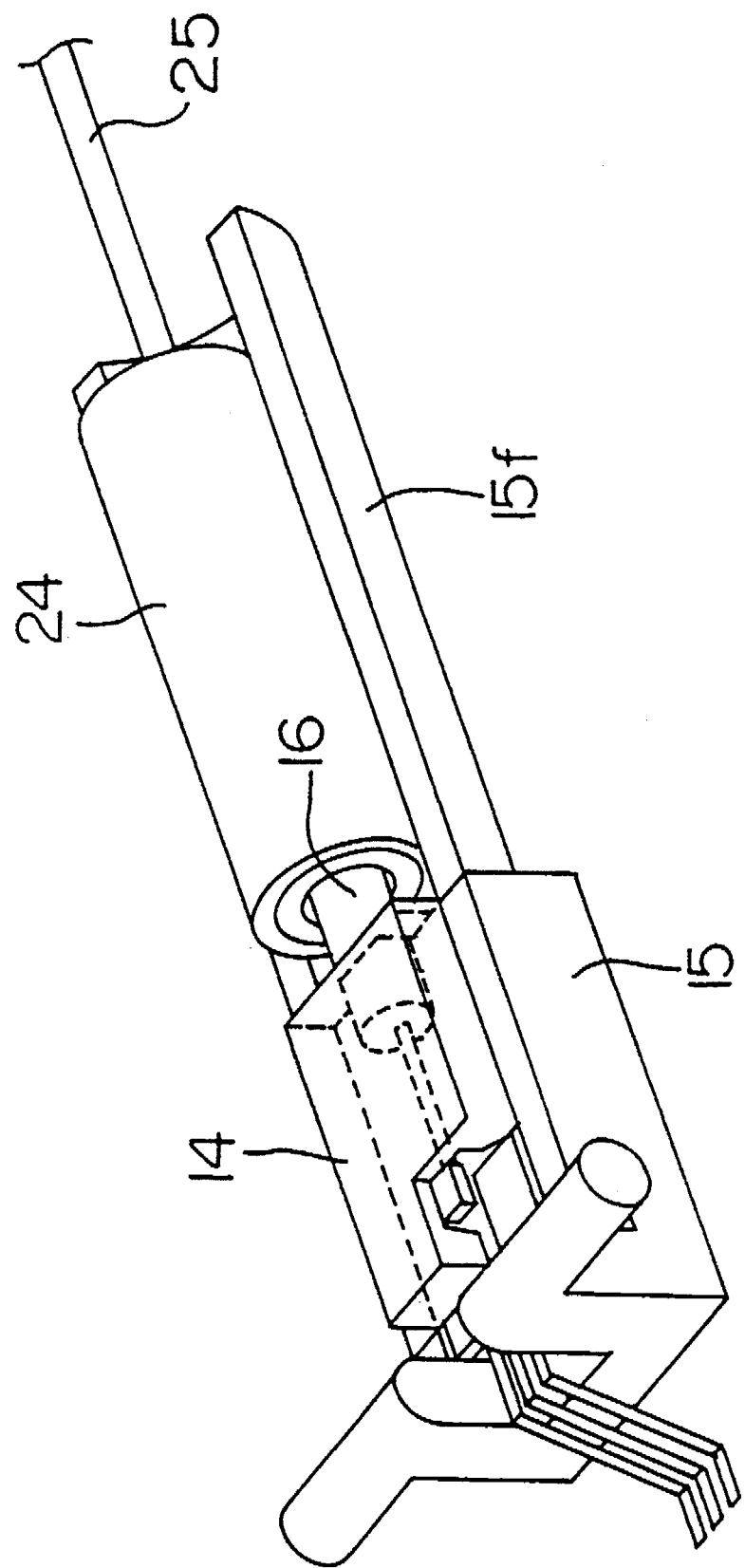
FIG. 13 is a diagram showing how the optical link module is connected with the terminal.
Figure 14:
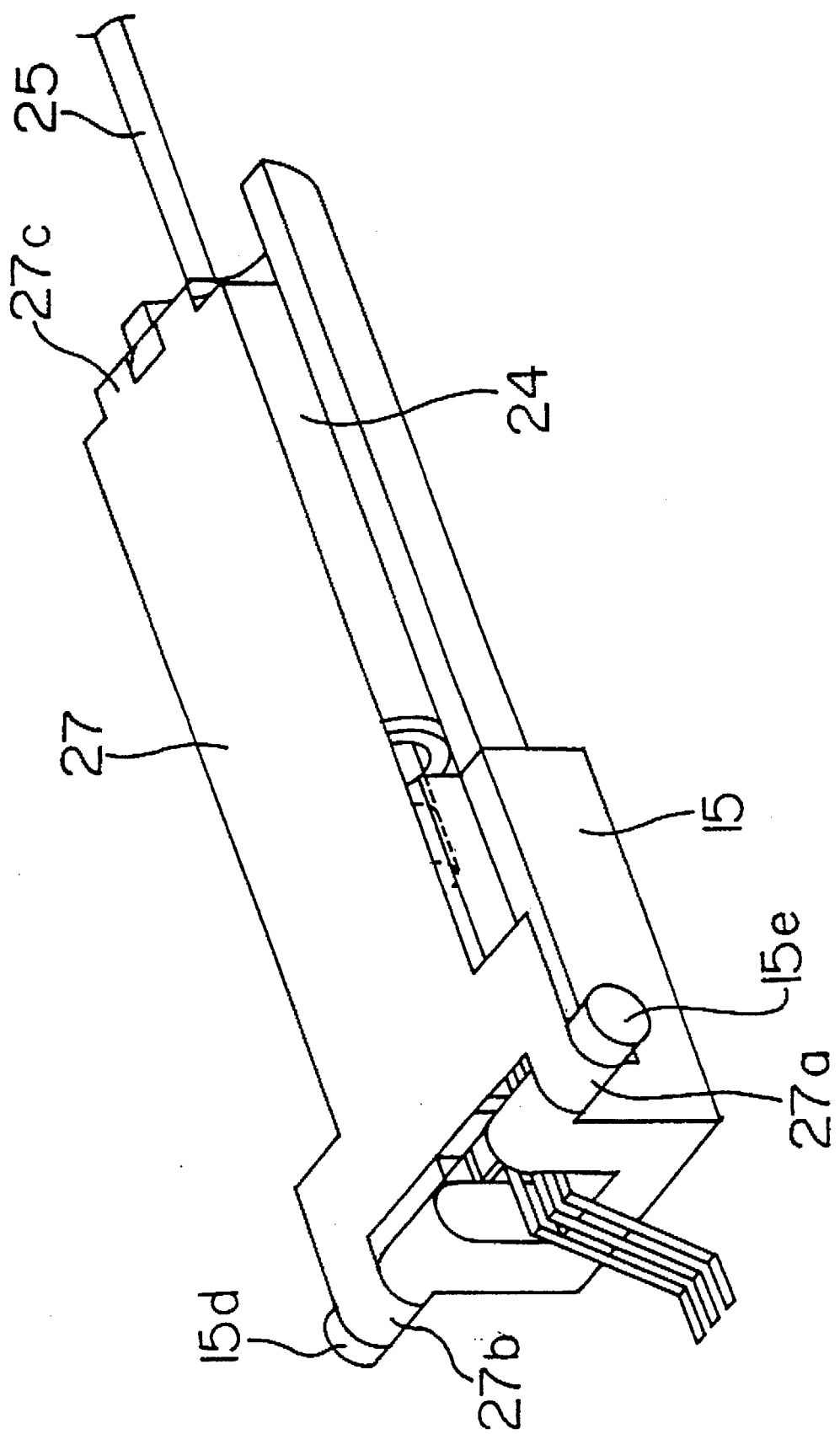
FIG. 14 is a diagram showing how the optical fiber is fixed with the metal plate spring.

After the flow soldering is finished, the terminal 24 is slid in along the ferrule guide 15f of the housing 15 so that the ferrule 16 will contact the ferrule 24d in the terminal 24 (FIG. 13). The hooks 27a and 27b are then hooked on the projections 15d and 15e of the housing 15, and simultaneously, the hook 27c latches the end of the terminal 24 not to fall off from the ferrule 16 (FIG. 14).

As described above, the housing 15 with the optical link module 14 fixed thereon is first mounted on the PC board 26 by flow soldering, and the terminal 24 is then connected to the optical link module 14. Note here that it is possible to apply an automatic soldering process to the PC board assembly because the optical fiber 25 with a non-heatresistant coating is not yet mounted at that stage. This naturally results in a reduction of the manufacturing cost.

Besides being composed of less parts than regular connectors, the terminal 24 can be built mostly with commercially available, economical components. Further, a reliable coupling between the terminal 24 and optical link module 14 is realized by a simple mechanism that joins them solely with the metal plate spring 27. The body of the optical link module 14 consists of two silicon substrates 17 and 18, whose material, silicon, is also low-cost.

Those factors totally contribute to the provision of optical link module connection systems at a lower cost than ever, in spite of having an extra component, i.e., the terminal 24.

In conventional systems, the optical fiber must have an extra length (e.g., 1–2 m) that may be cut off when the optical axis alignment was not obtained in the first trial of its connection to the optical link module. In contrast to this, the present embodiment no longer requires such an extra length, because the optical fiber 25 is not directly connected to the laser diode 19 and the adjustment of their optical axis alignment is thus eliminated.

Instead, it is necessary to adjust the optical axis alignment when assembling the terminal 24 with the optical fiber 25. In actual production lines, any inferior product having an intolerable misalignment would be just scrapped, while the product consists of the standard optical fiber connector 6, the terminal 24 and the optical fiber 25. This kind of screening has not been practical at all in the conventional systems because the conventional product includes an expensive optical link module. This is the reason why the conventional processes have involved the reform of optical fiber product as mentioned above. In the present embodiment, however, the product does not include such a costly component, thus permitting the disposal of inferior products without worrying about their expense.

Figure 15:
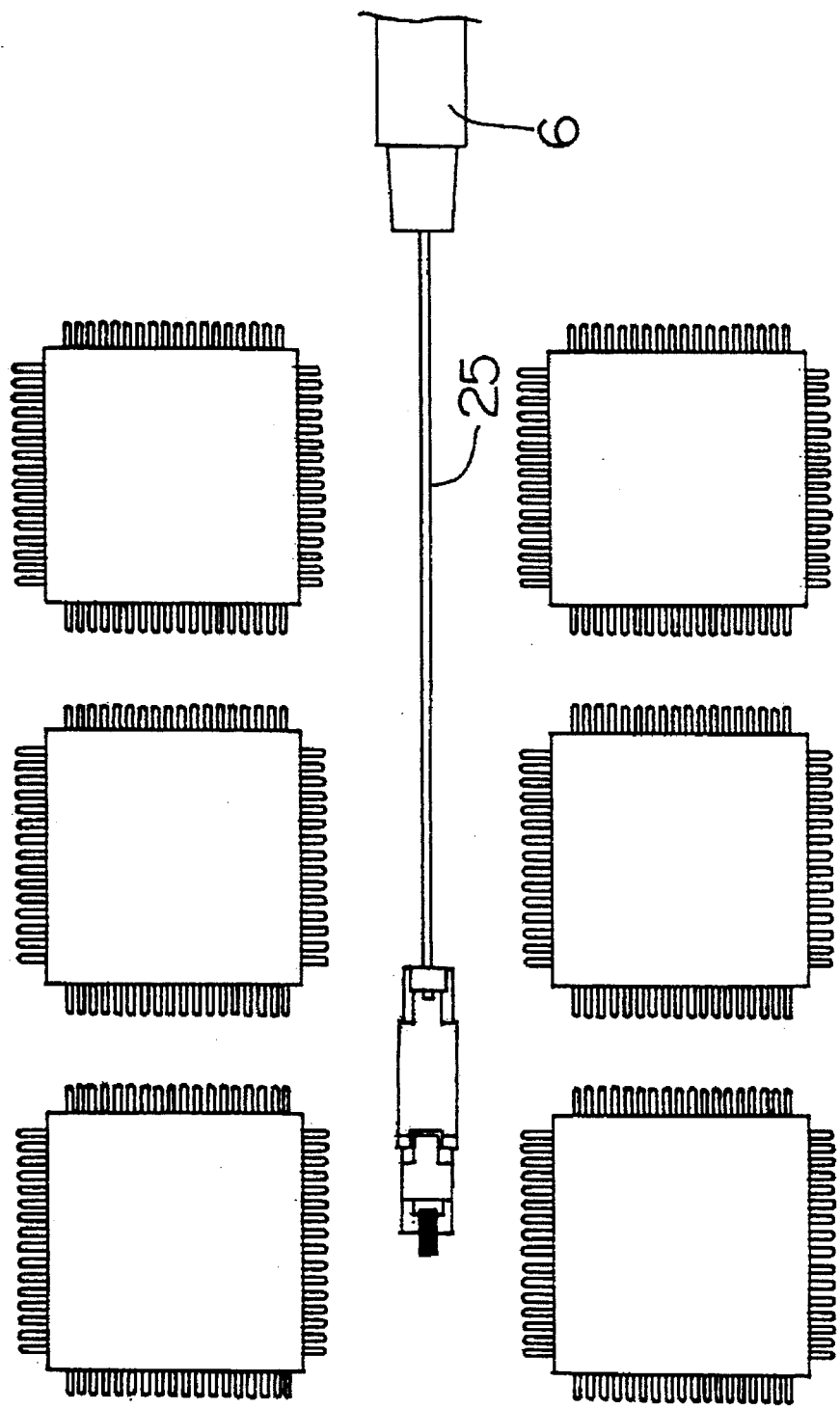
FIG. 15 is a diagram showing how the optical fiber is routed on the PC board.

As a result of the new structure, the length of the optical fiber 25 can be fixed to 90 mm, for example, and this solves the problem with storage space and handling in the shop floor. It also improves the space utilization, as shown in FIG. 15, enabling more components to be mounted on the PC board.

Incidentally, the above-described first embodiment uses the laser diode 19 as the optoelectronic conversion element 3a to convert an electric signal to an optical signal. Alternatively, this optoelectronic conversion element 3a can be a photodiode that converts an optical signal to an electric signal.

Figure 16:
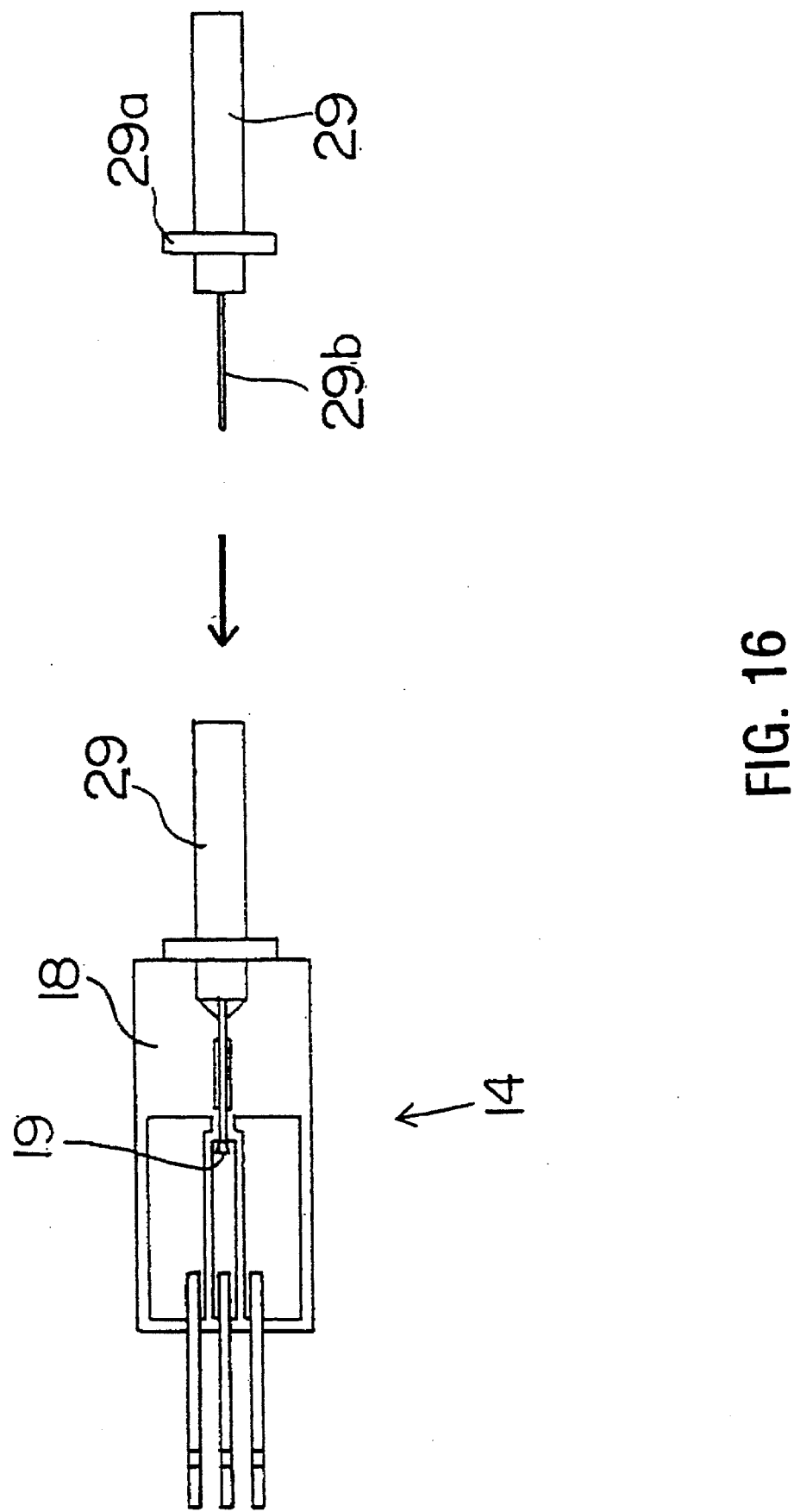
FIG. 16 is a diagram showing another type of ferrule.

FIG. 16 illustrates another type of ferrule whose structure is different from that of the ferrule 16 for the optical link module 14 in the first embodiment. Note that the following discussion will not mention some elements already described in the first embodiment, while maintaining their consistent reference numerals.

A ceramic or metal ferrule 29 has a flange 29a at a predetermined position of its body and an optical fiber 29b that is cut in a predetermined length measured from the flange 29a.

This ferrule 29 receives a compressive force of about 1 kgf (9.8N) from the terminal 24. This force could cause a damage to the silicon substrates 17 and 18 if it was directly applied to the optical link module 14. The flange 29a prevents such a force from concentrating at any particular point.

When assembling the module, the ferrule 29 should be inserted to the silicon substrate 18 so that the gap between the tip of the optical fiber 29b and the laser diode 19 be adjusted to 30 µm, for instance. The flange 29a eases this adjustment, for the predetermined gap will have been obtained when the flange 29a comes into contact with the silicon substrate 18. Consequently, the flange 29a prevents collision between the laser diode 19 and the tip of the optical fiber 29b from happening, thus avoiding any possible damage of them.

Figure 17:
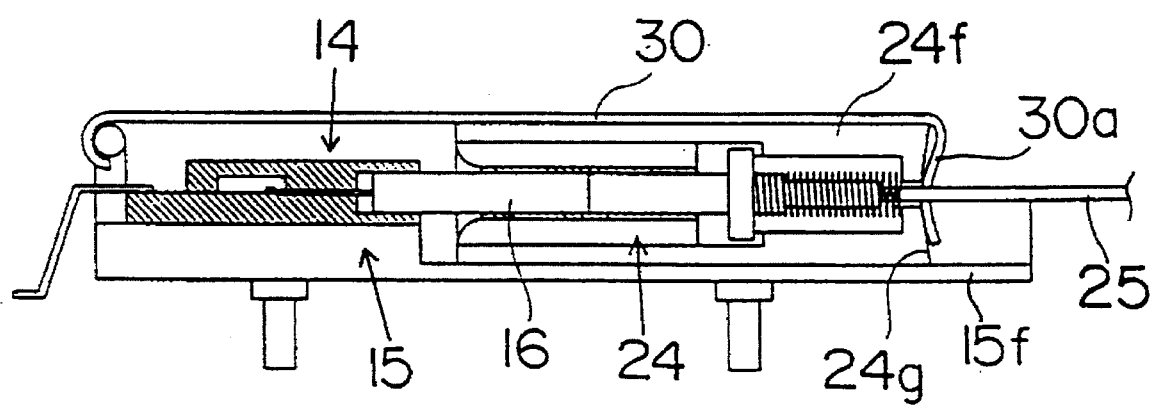
FIG. 17 is a diagram showing the structure of a first variation of the metal plate spring.

FIG. 17 illustrates the structure of a first variation of the metal plate spring 27 explained in the first embodiment. Note again that the following discussion will not mention some elements already described in the first embodiment, while they are provided with the consistent reference numerals.

A metal plate spring 30 has a hook 30a formed in a convex curve facing inside. This convex hook mates with a concave face 24g formed at the end of the housing 24f of the terminal 24. Such structure permits the metal plate spring 30 to latch the terminal 24 with more steadiness.

FIGS. 18(A) and 18(B) are a plan and side views, respectively, showing the structure of a second variation of the metal plate spring 27 explained in the first embodiment. Note that the following will not mention some elements already shown in the first embodiment, while they bear the consistent reference numerals.

A metal plate spring 31 has two ribs 31a and 31b to enhance its rigidity. These ribs 31a and 31b also ensure steady fastening of the terminal 24 by grasping the ferrule guide 15f of the housing 15.

FIGS. 19(A) and 19(B) are a plan and side views, respectively, showing the structure of a third variation of the metal plate spring 27 explained in the first embodiment. Note that the following will not mention some elements shown in the first embodiment, while maintaining their consistent reference numerals.

In this alternative structure, a metal plate spring 32 has an elastic plastic member 32a, and the housing 15 has two projections 15i and 15j on its ferrule guide 15f. While those projections 15i and 15j guide the metal plate spring 32 moving down to the engagement position, the elastic plastic member 32a fastens the terminal 24 to the housing 15 with its elasticity. This mechanism facilitates hooking and releasing operations for the metal plate spring 32 and also increases steadiness in the fastening of the terminal 24 to the module housing 15.

Figure 20:
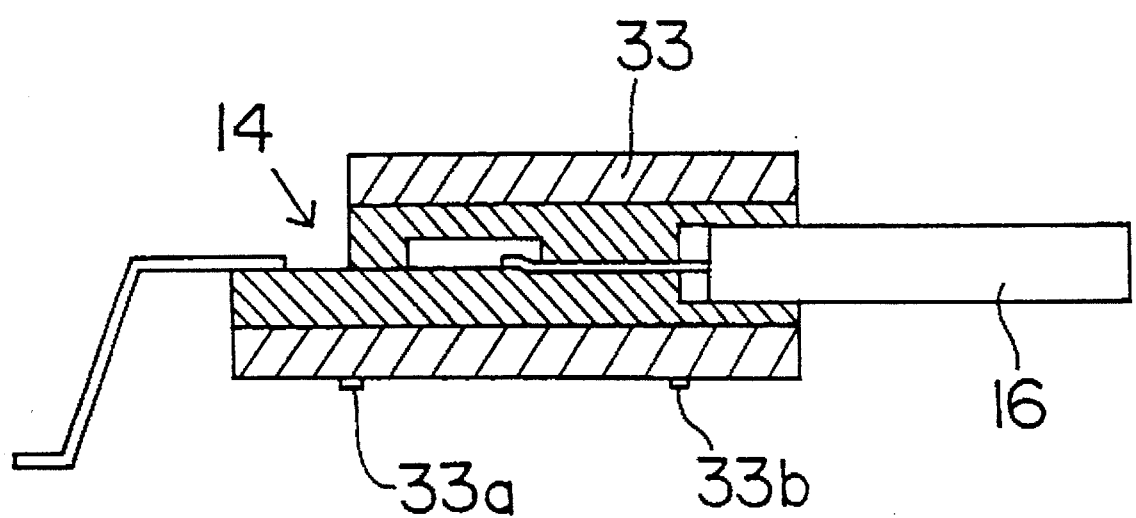
FIG. 20 is a section view showing the structure of another optical link module.

FIG. 20 shows the structure of a variation of the optical link module 14 explained in the first embodiment, which variation is newly equipped with a metal frame 33. As usual, the following discussion will not mention some elements that are already described in the first embodiment, while they keep the consistent reference numerals.

In this alternative structure, the metal frame 33 covers the body of the optical link module 14 as well as having two dowels 33a and 33b on its bottom surface. The dowels 33a and 33b will be welded to the mounting space 15a (cf. FIG. 10) when mounting the optical link module 14 to the housing 15.

As described before, the ferrule 16 is subjected to a compressive force of about 1 kgf (9.8N), being pushed by the terminal 24. The above structure effectively prevents any damage due to the force from happening to the silicon substrates 17 and 18 constituting the optical link module 14.

Next, a second embodiment of the present invention will be explained below.

Figure 2:
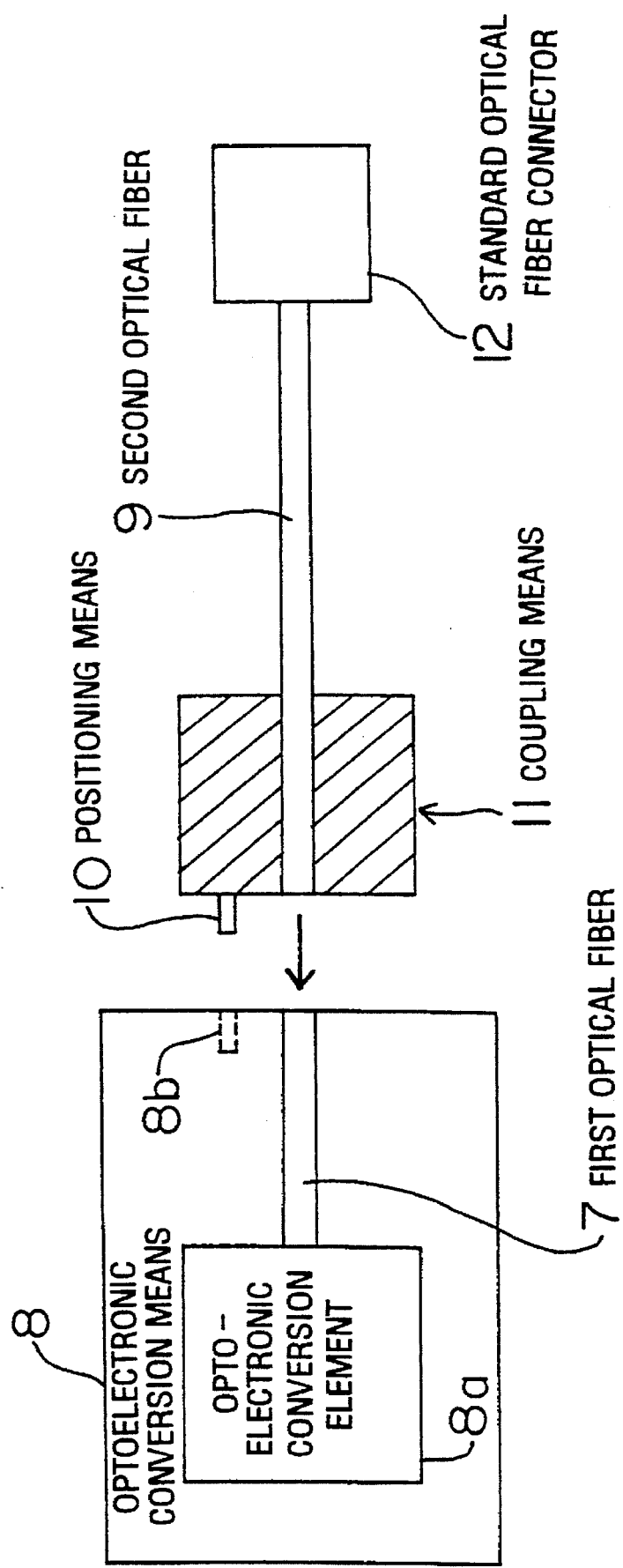
FIG. 2 is a second conceptual view of the present invention.

First of all, principle of the second embodiment should be clarified with reference to FIG. 2. The second embodiment is mainly constructed with three elements. The first element is optoelectronic conversion means 8 for converting an electric signal to an optical signal or vice versa, at whose end surface an endface of a first optical fiber 7 is exposed. The second element is coupling means 11 for providing optical coupling between the first optical fiber 7 and a second optical fiber 9. This coupling means 11 is located at one end of the second optical fiber 9 and has an end surface opposed to the optoelectronic conversion means 8. An end of the second optical fiber 9 is left exposed on this end surface of the coupling means 11, and positioning means 10 is also provided there for positioning the endfaces of the first and second optical fibers 7 and 9 so that they will precisely face each other. Lastly, the third element is a standard optical fiber connector 12 attached to the other end of the second optical fiber 9. The details of these elements will be presented below with reference to FIGS. 21 to 32.

Figure 21:
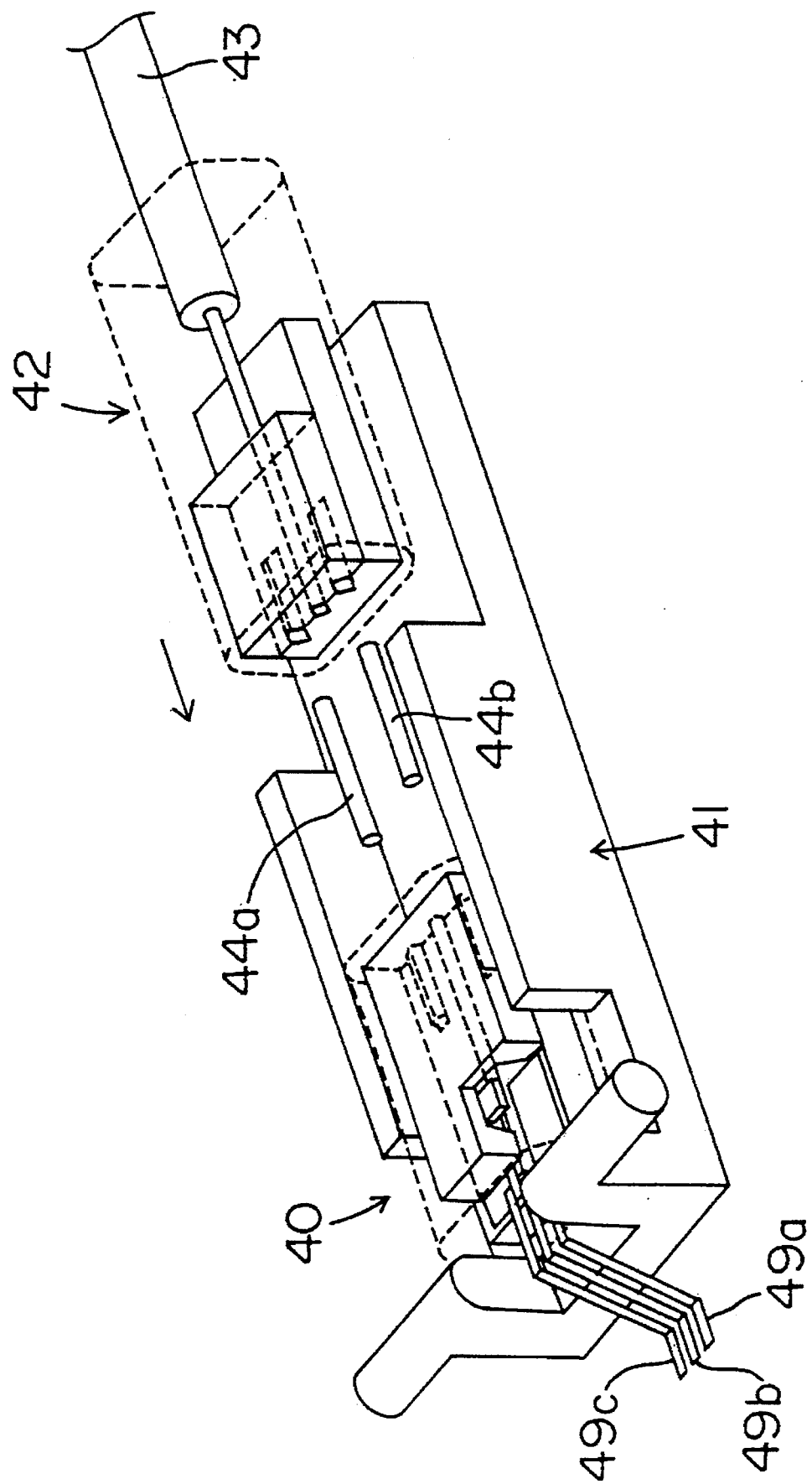
FIG. 21 is a diagram showing the structure of a second embodiment.

FIG. 21 illustrates a specific structure of the optoelectronic conversion means 8 and coupling means 11 schematically shown in FIG. 2. In FIG. 21, the optoelectronic conversion means 8 is actually implemented as a collection of an optical link module 40, a housing 41 to hold the module, and others. A terminal 42 in FIG. 21 (corresponding to coupling means 11 in FIG. 2) is attached to one end of an optical fiber 43 (corresponding to the second optical fiber 9 in FIG. 2), while a standard optical fiber connector (not shown in figure) is attached to the other end. With two guide pins 44a and 44b (corresponding to the positioning means 10), the terminal 42 fits into the optical link module 40. Leads 49a–49c of the optical link module 40 are used for electrical connection to a PC board (not shown in figure).

Figure 22:
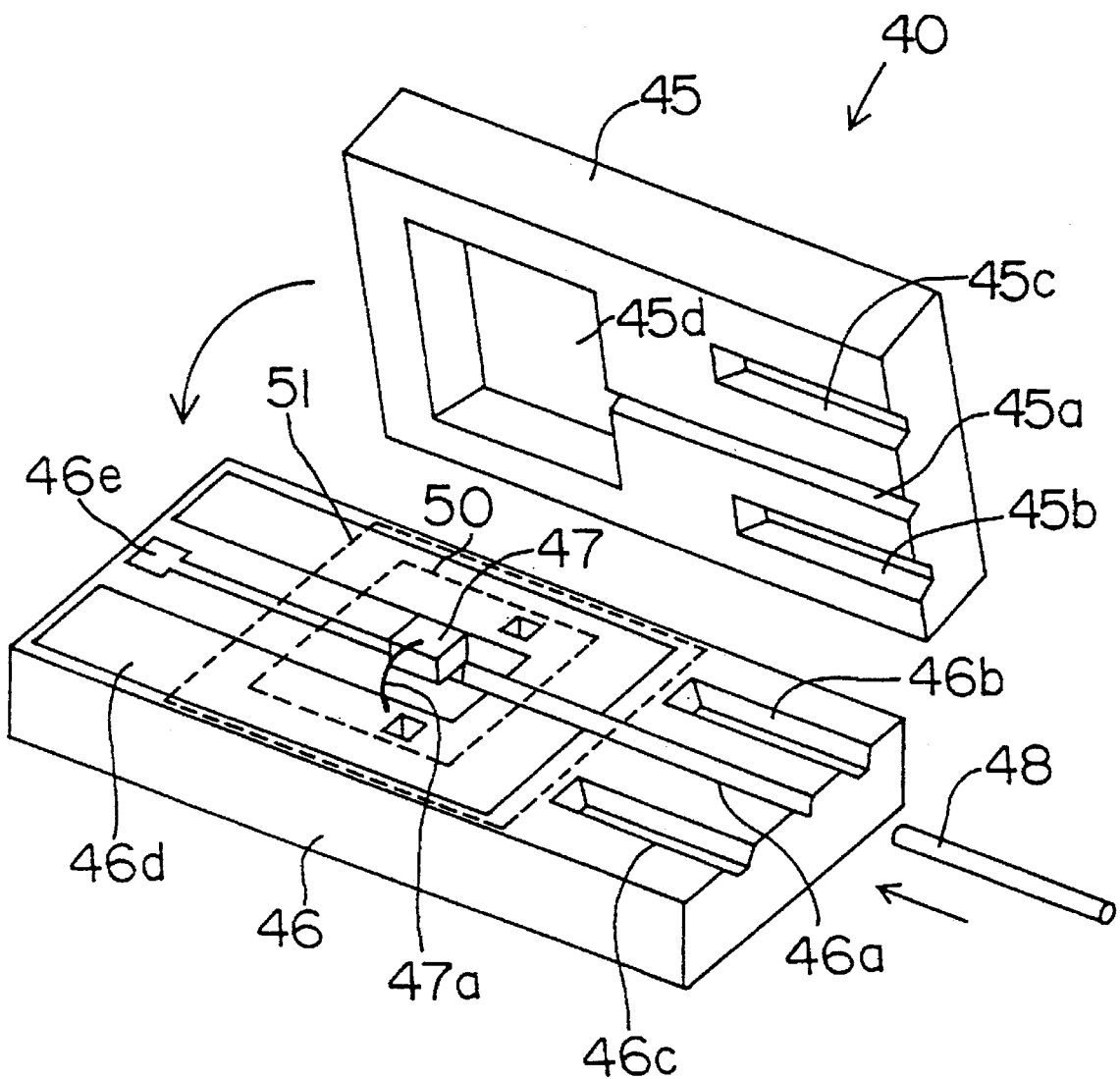
FIGS. 22, 23, and 24 are assembly diagrams of the optical link module.
Figure 23:
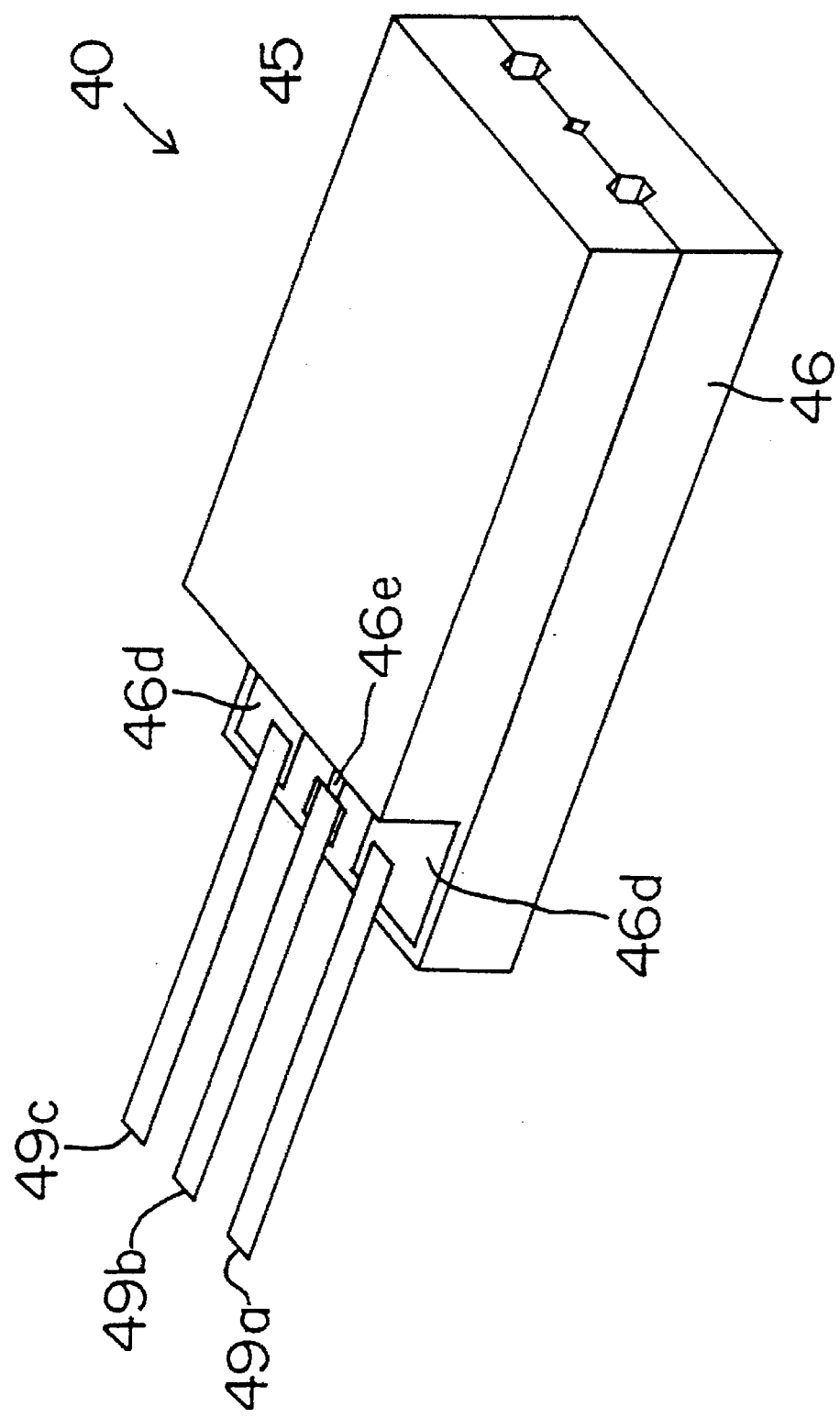
Figure 24:
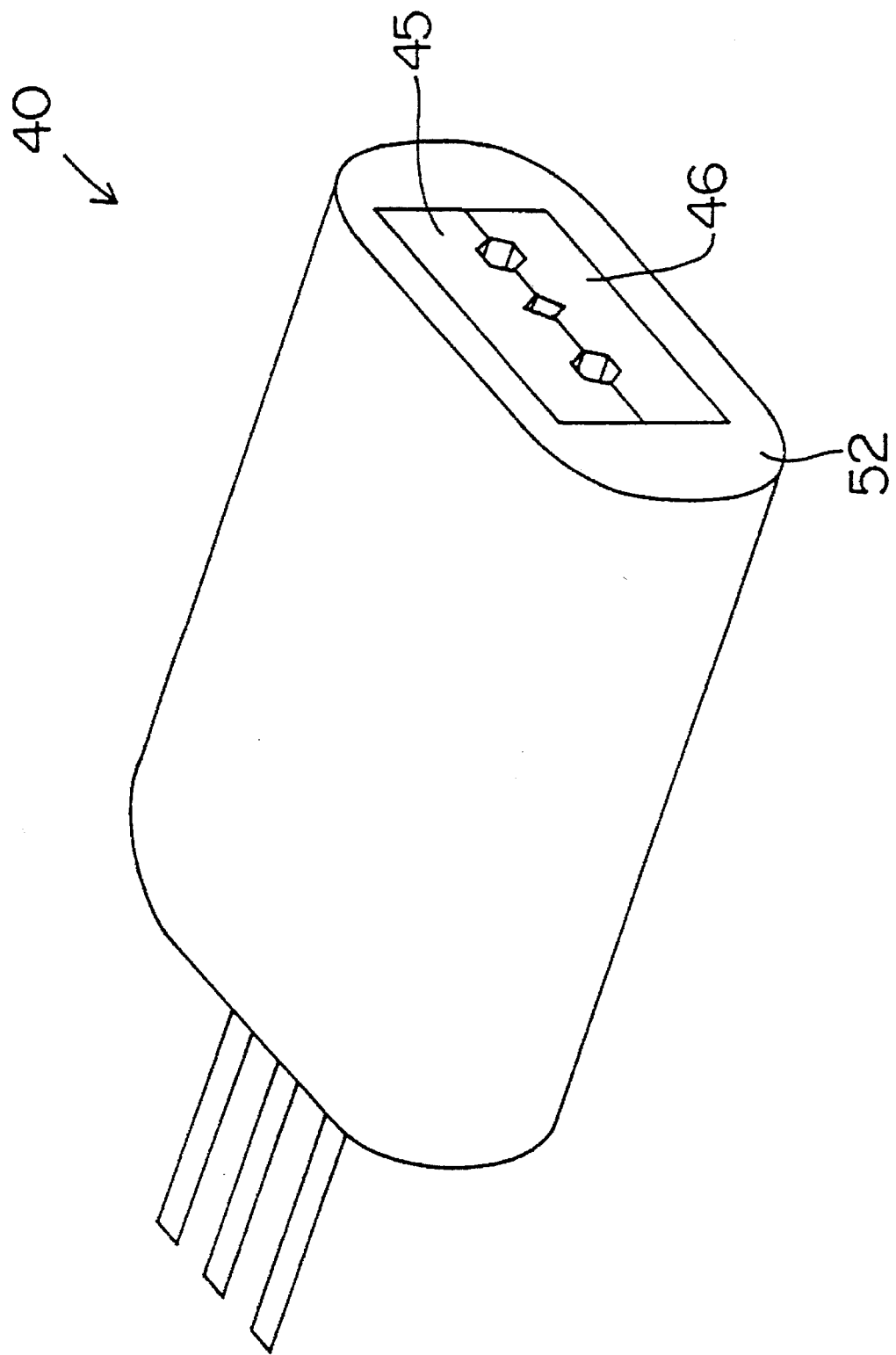

FIGS. 22, 23, and 24 show the structure of the optical link module 40 as well as illustrating how it is assembled. The explanation will start with the module structure shown in FIG. 22.

The optical link module 40 consists of two silicon substrates 45 and 46 made of silicon and a laser diode (LD) 47 held therebetween. An optical fiber stub 48, having no coating, is also held between the silicon substrates 45 and 46. Here, the optical fiber stub 48 corresponds to the first optical fiber 7 in FIG. 2, and the laser diode 47 the optoelectronic conversion element 8a.

The lower silicon substrate 46 has a V-groove 46a to house the optical fiber stub 48 and two V-grooves 46b and 46c to accept the guide pins 44a and 44b, while the upper silicon substrate 45 has three V-grooves 45a, 45b, and 45c corresponding to the V-grooves 46a, 46b, and 46c, respectively, on the lower silicon substrate 46. A cavity 45d is engraved on the upper silicon substrate 45 to house the laser diode 47.

A negative metal contact layer 46d and a positive metal contact layer 46e are formed on the lower silicon substrate 46, where the negative electrode of the laser diode 47 is connected to the negative metal contact layer 46d via a flying lead 47a and the positive electrode is bonded to the positive metal contact layer 46e. Then, the leads 49a, 49b, and 49c are connected to the negative metal contact layer 46d, positive metal contact layer 46e and negative metal contact layer 46d, respectively. The optical fiber stub 48 is placed in the V-groove 46a on the lower silicon substrate 46, and adjusted so that its tip will face the light spot of the laser diode 47. After that, some amount of thermosetting resin adhesive is applied to an area between two closed broken lines 50 and 51, and the upper silicon substrate 45 is put on it for fixation. Here, an optional treatment to roughen the surfaces of the lower and upper silicon substrates 46 and 45 by etching will help the adhesion. This treatment is also applicable to the first embodiment. Finally, an excessive portion of the optical fiber stub 48 sticking out of the silicon substrates 45 and 46 is cut off and that end surface is polished together with the side surface of the silicon substrates 45 and 46.

The above-described assembly procedure yields the optical link module 40 containing the laser diode 47 sealed up therein. The assembled optical link module 40 is further wrapped up with aluminum foil and molded as shown in FIG. 24 for encapsulation with a mold body 52. Plastic materials for the mold may include epoxy, urethane, acrylic, and other types of thermoset polymer compounds.

Figure 25:
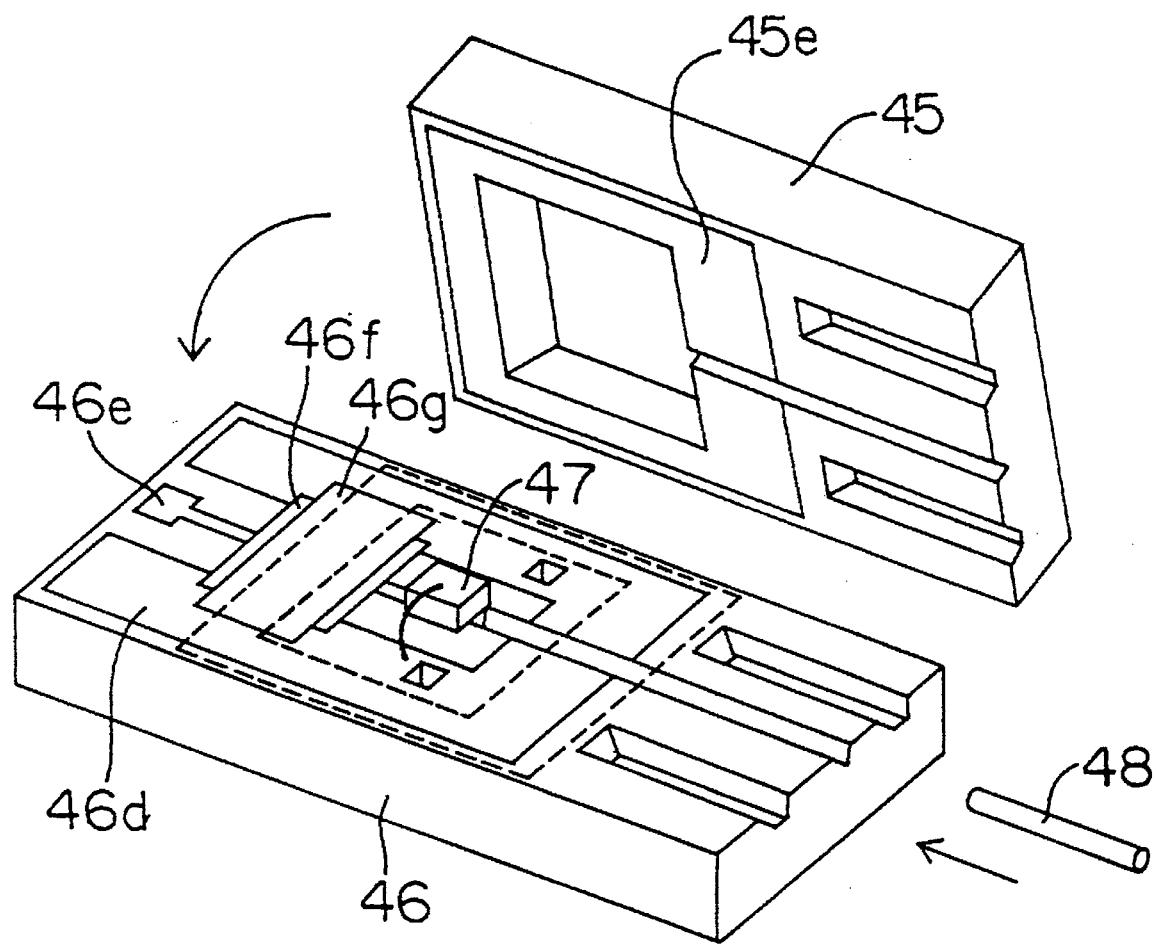
FIG. 25 is another assembly diagram of the optical link module.

FIG. 25 shows another type of optical link module and how it is assembled. Note here that the following discussion will not mention some elements that have already appeared in FIGS. 22–24, maintaining their the consistent reference numerals.

Inside this optical link module, there is provided an insulation layer 46f on the positive metal contact layer 46e, and a metal layer 46g is formed further on it. Having been added a solder coating 45e beforehand, the upper silicon substrate 45 is put over the lower silicon substrate 46, and the two substrates are pressed and heated for bonding. The above procedure yields the optical link module 40 containing the laser diode 47 sealed up therein.

FIG. 26 illustrates how the assembled optical link module 40 is coupled with the terminal 42 assembled at an end of the optical fiber 43, being led by two guide pins 44a and 44b. The guide pins 44a and 44b are inserted separately to the optical link module 40 and the terminal 42, respectively, and then fixed with adhesive.

FIGS. 27(A) and FIG. 27(B) are a plan and side views, respectively showing the structure of the terminal 42. The terminal 42 consists of two silicon substrates 42a and 42b made of silicon and a mold body 42f. The both silicon substrate 42a and 42b have three V-grooves 42c, 42d, and 42e to house the optical fiber 43 and the guide pins 44a and 44b. A nylon coating to protect the optical fiber 43 should be partly removed and placed to the V-groove 42c, and subsequently, the silicon substrates 42a and 42b are bonded together. The excessive fiber stub sticking out of the silicon substrates 42a and 42b is then cut off and its endface is polished together with the side surfaces of the silicon substrates 42a and 42b. After that, the assembled terminal 42 and optical fiber 43 are molded for encapsulation with a mold body 42f. The guide pin 44b is inserted to the V-groove 42d and fixed with adhesive.

To couple this terminal 42 with the optical link module 40, it is necessary to insert the guide pin 44a of the optical link module 40 into the V-groove 42e of the terminal 42, and simultaneously, the guide pin 44b of the terminal 42 into the V-grooves 45c and 46c of the optical link module 40. The endfaces of the terminal 42 and optical link module 40 will thereby come into contact with each other in predetermined tolerances, resulting in a fine optical axis alignment of the optical fiber pair 43 and 48 and in excellent reliability in optical signal transfer.

Figure 28:
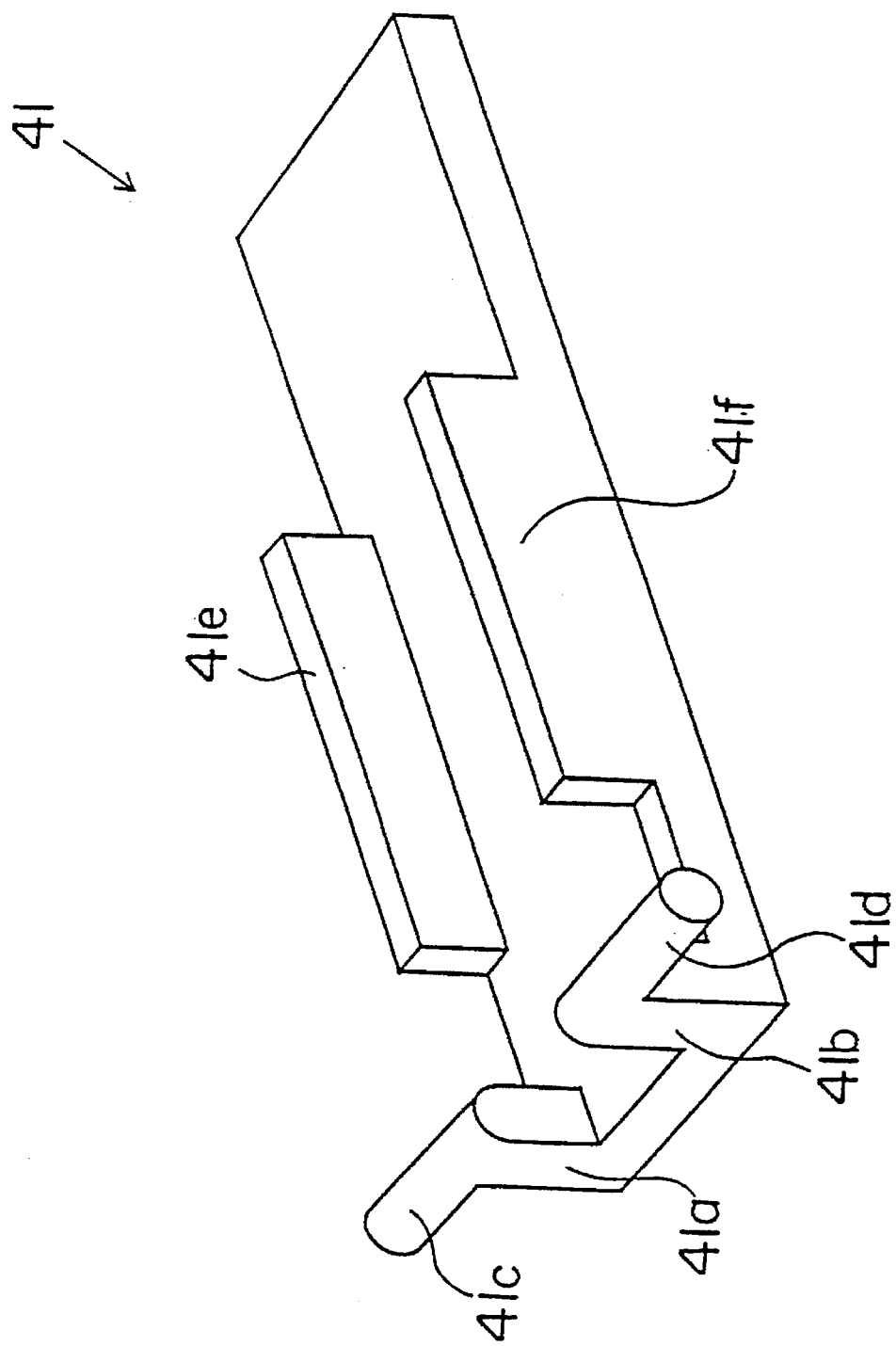
FIG. 28 is a diagram showing the structure of a housing.
Figure 29:
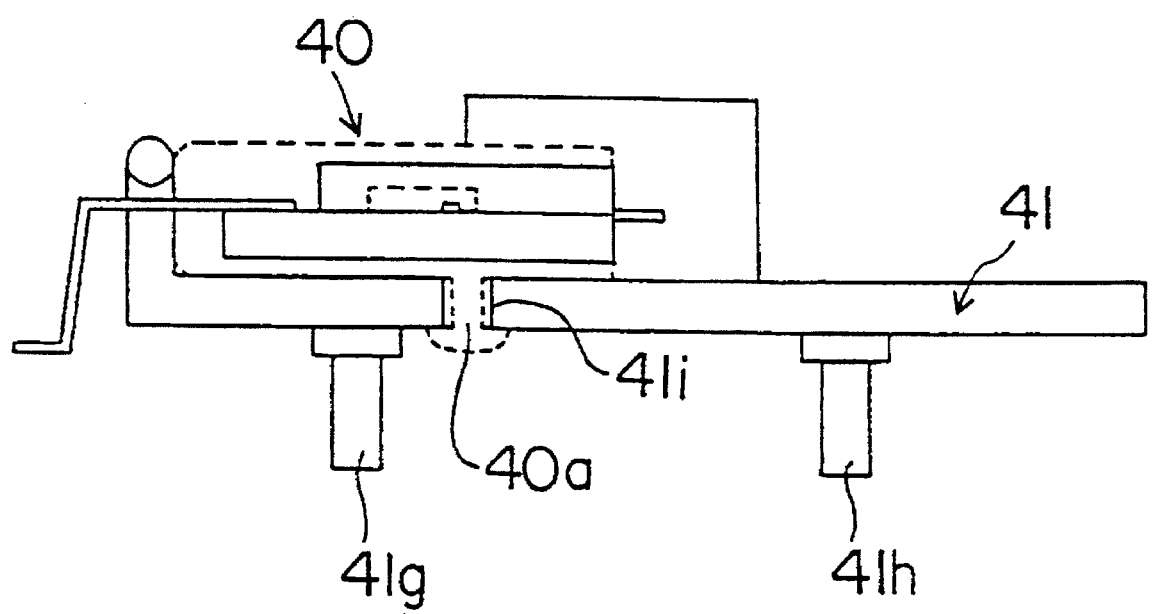
FIG. 29 is a side view of the housing.

FIG. 28 is an isometric view to show the structure of the housing 41. That is, the housing 41 has the following distinctive portions: stopper walls 41a and 41b which the optical link module 40 will be pressed against for positioning; projections 41c and 41d where a metal plate spring (to be described later on) will be hooked, and two guide walls 41e and 41f which will help insertion of the terminal 42. The housing 41 is made of steel, for example, and plated with nickel. Further, the housing 41 has two solder-plated legs 41g and 41h as shown in FIG. 29, which are to be inserted and soldered to the PC board in a flow soldering process. A hole 41i is bored at the bottom of the housing 41, and a post 40a (as part of the mold body 52) projecting from the bottom of the optical link module 40 is inserted thereto. The optical link module 40 will be fixed to the housing 41 by crimping this post 40a through the application of heat.

Figure 30:
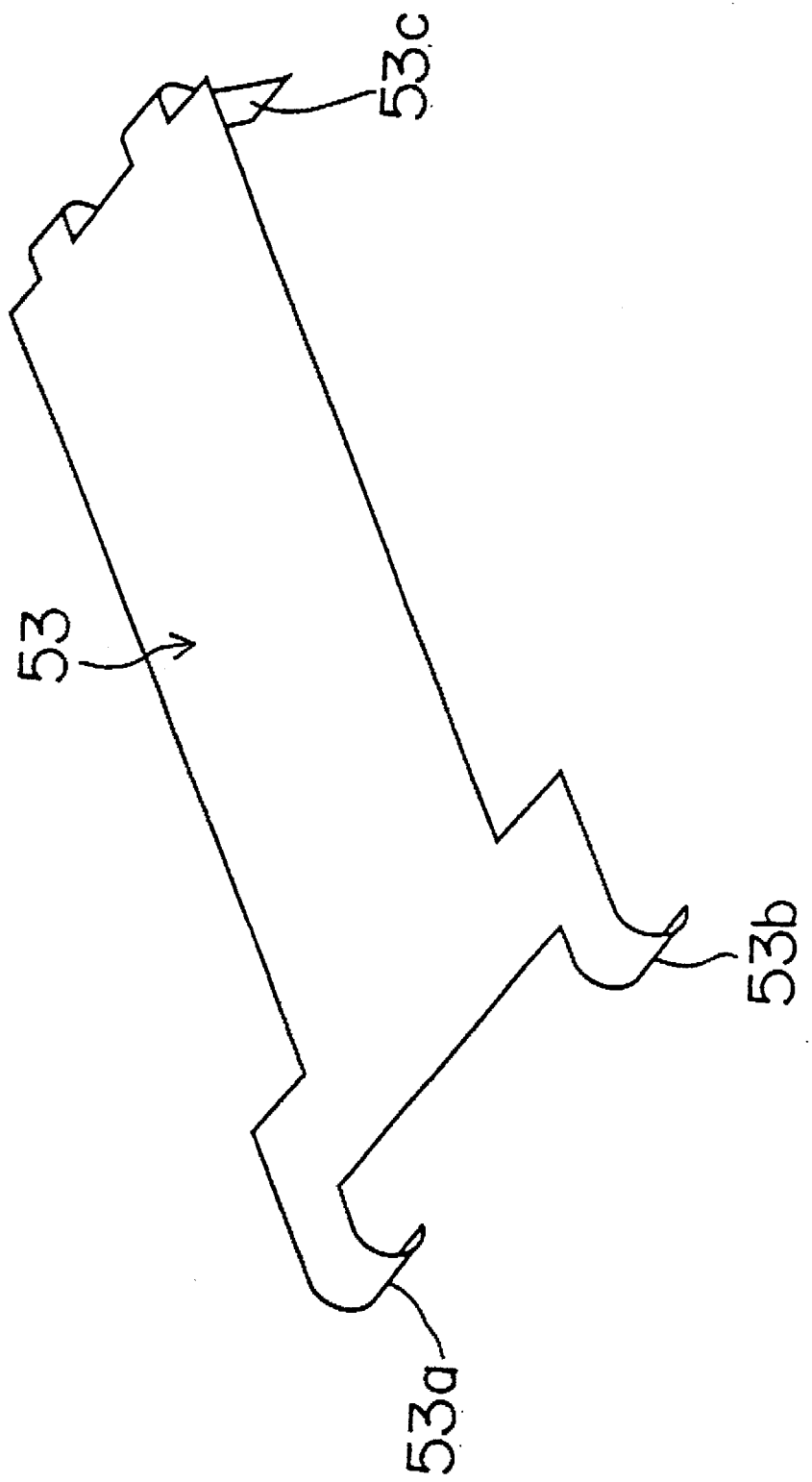
FIG. 30 is a diagram showing the structure of a metal plate spring.

FIG. 30 shows the structure of a metal plate spring 53. This metal plate spring 53, made of stainless steel, has two hooks 53a and 53b to hook on the projections 41c and 41d of the housing 41 and another hook 53c to latch the terminal 42. The metal plate spring 53 can pivot on the hooks 53a and 53b. The hook 53c latches the terminal 42, thereby preventing it from losing the connection with the optical link module 40.

The next explanation will focus on the procedure of mounting the above-described components on a PC board for electrical interconnection.

The procedure starts with fixation of the optical link module 40 to the housing 41 by heat crimping techniques. The housing 41 is then mounted on the PC board through a flow soldering process (FIG. 29). The optical link module 40 can stand high temperatures in the flow soldering process, because the optical fiber stub 48 integrated therein has no coating or jacket that would only exhibit poor heat resistance.

Figure 31:
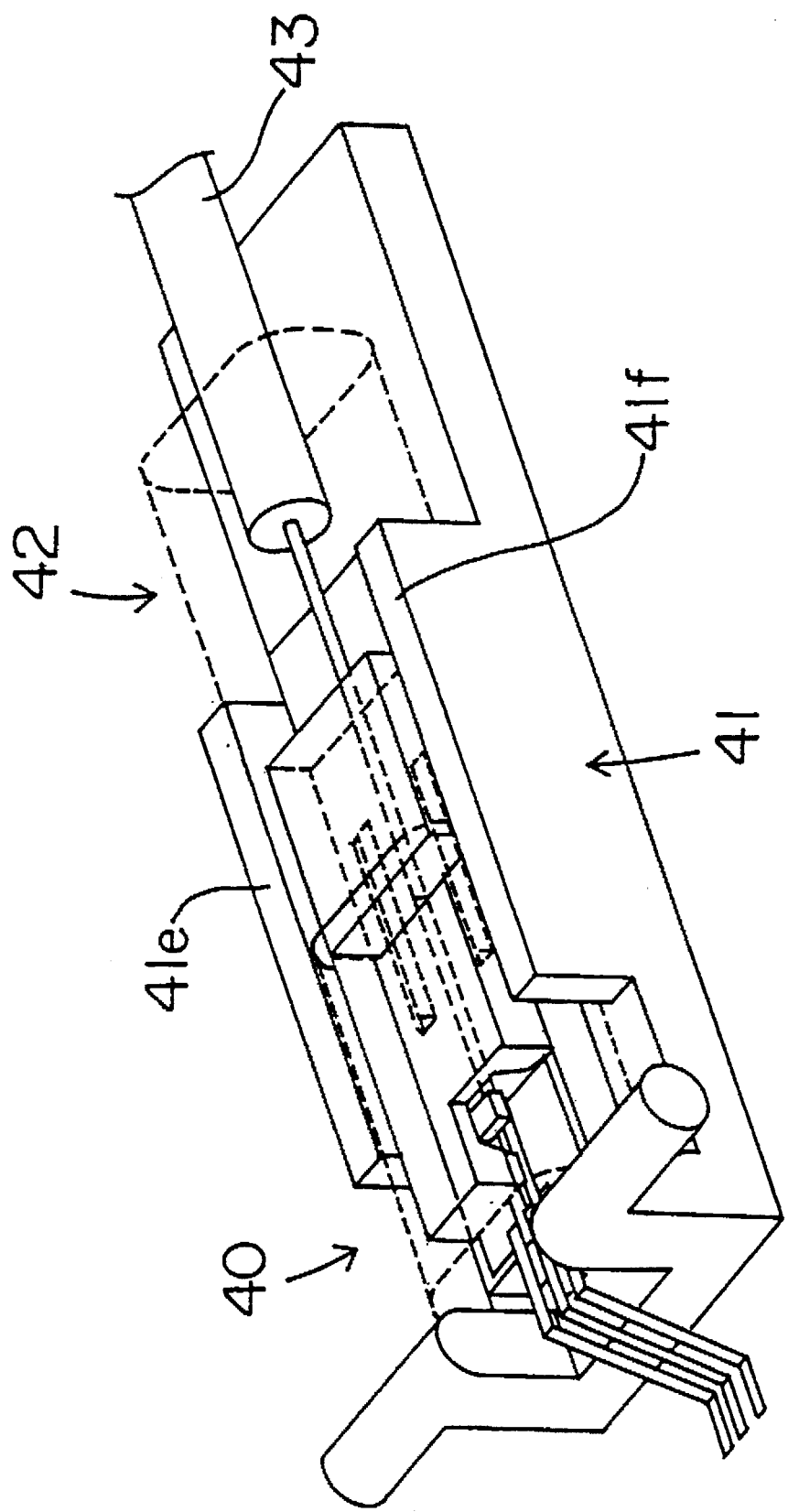
FIG. 31 is a diagram showing how the terminal is connected to the optical link module.
Figure 32:
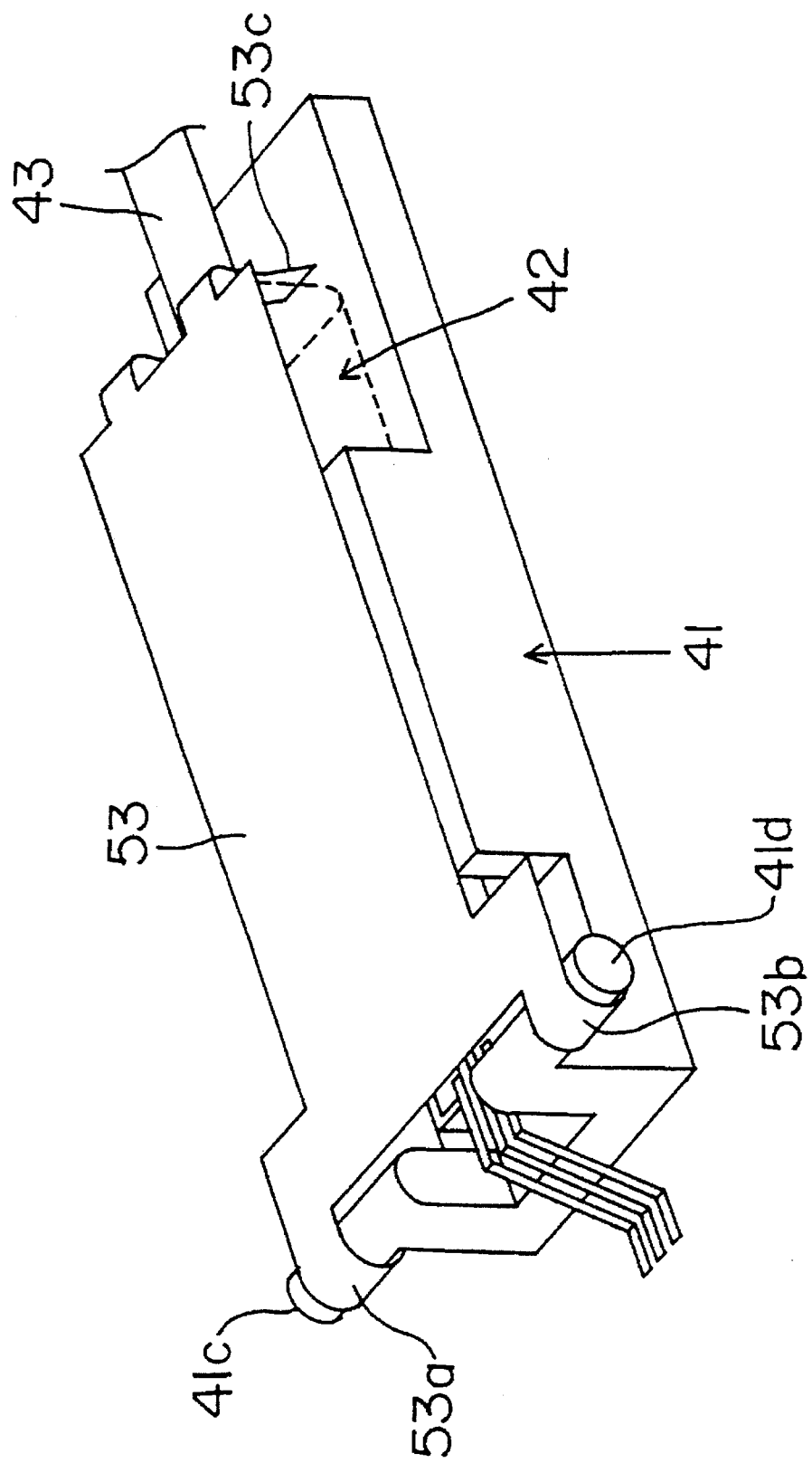
FIG. 32 is a diagram showing how the optical fiber is fixed with the metal plate spring.

After the flow soldering is finished, the terminal 42 is slid in along the guide walls 41e and 41f of the housing 41 so that the endface of the terminal 42 will come in contact with that of the optical link module 40 (FIG. 31). The hooks 53a and 53b of the metal plate spring 53 are then hooked on the projections 41c and 41d of the housing 41, and the other hook 53c latches the end of the terminal 42 not to fall off from the optical link module 40 (FIG. 32).

As such, the housing 41 having the optical link module 40 fixed thereon is first mounted on the PC board by flow soldering, and after that, the terminal 42 is coupled with the optical link module 40. Note here that it is possible to use automatic soldering equipment in the PC board assembly process, because the optical fiber 43 having a non heat-resistant coating is not yet mounted at that stage. This naturally results in a reduction of the manufacturing cost.

Besides being composed of less components, the terminal 42 is made of low-cost silicon. Further, a reliable coupling between the terminal 42 and the optical link module 40 is achieved by a simple mechanism that combines them with the single metal plate spring 53 similarly to the first embodiment. The body of the optical link module 40 is also made of low-cost silicon.

Those factors totally contribute to the provision of an optical link module connection system at a lower cost than ever, in spite of having an extra component, i.e., the terminal 42.

Similarly to the first embodiment, the optical fiber 43 is not required to have an extra length, because it is not directly connected to the laser diode 47, thus eliminating the adjustment of their optical axis alignment.

Concerning the terminal 42, it is still necessary to adjust the alignment when assembling it with the optical fiber 43. Actually, any inferior product having an intolerable misalignment would be just scrapped although the product consists of the standard optical fiber connector 12, the terminal 42 and the optical fiber 43. This kind of screening has not been practical at all in the conventional systems because the conventional product includes an expensive optical link module. This is the reason why the reform of optical fiber has been done in the conventional systems as mentioned before. In the present embodiment, however, the product does not include such a costly component, thus permitting the disposal of inferior products without concerning their expense.

As a result of the new structure, the length of the optical fiber 43 can be fixed to 90 mm, for example, and it solves the problems with storage space and handling in the shop floor. It also improves the space utilization factor and enables more components to be mounted on the PC board.

Incidentally, the second embodiment also uses the laser diode 47 as the optoelectronic conversion element 8a to convert an electric signal to an optical signal. As an alternative for this optoelectronic conversion element 8a, a photodiode may be used to reversely convert the signals, i.e., from optical to electric.

FIGS. 33(A), 33(B), and 33(C) illustrate the structure of another type of silicon substrate that is different from the silicon substrate 46 for the optical link module 40 explained in the second embodiment. Note that the following discussion will not mention some elements already shown in the second embodiment, maintaining their consistent reference numerals.

When installing the optical fiber stub 48 into the V-groove 46a of the lower silicon substrate 46 in the second embodiment as shown in FIG. 22, it is necessary to locate the tip of the stub close to the laser diode 47. In this step of the process, a groove on the silicon substrate 46, if provided near that meeting point as perpendicularly crossing the V-groove 46a, would contribute to accuracy and repeatability in the control of a gap between the optical fiber stub 48 and the laser diode 47. This groove is called here a stopper groove, and it is processed in the following manner.

Each piece or chip of the silicon substrate is designed to be 10 mm×10 mm or smaller in size, and such silicon chips 55 and 56 are aligned as shown in FIG. 33(A). FIG. 33(C) shows how a number of silicon chips will be cut out from a single silicon wafer 58 fabricated at a time. The stopper groove and other V-grooves should be processed before dividing the wafer. FIG. 33(B) shows the movement of a cutter to engrave the stopper groove, where the cutter moves across the multiple silicon chips 55 and 56. This processing method of the stopper groove 57 makes the manufacturing time much shorter than any other process that individually engraves a local portion near the laser diode. After that, as illustrated in the silicon chip 55, adhesive sheets 55a and 55b are affixed over the stopper groove 57 and applied with heat. The adhesive fills up the stopper groove 57 except for a portion in front of the laser diode. The remaining stopper groove 57 is thus sealed up, preventing water or other foreign matter from reaching the laser diode through the groove. Finally, the multiple silicon chips aligned as 55 and 56 are divided into individual pieces.

The silicon chips 55 and 56 thereby divided from the silicon wafer 58 are suitable for a later assembly process using standard equipment available for semiconductor manufacturing processes.

The above discussion has clarified that the second embodiment simplifies the process to cut the stopper groove, produces the silicon substrates from a large silicon wafer in the same way as fabrication of ordinary LSIs, and utilizes standard manufacturing equipment for the assembly process. These advantages will result in the provision of optical link modules at very low costs.

Note that the first embodiment can also receive the same benefit from the above-described method of manufacturing silicon substrates.

Figure 34A:
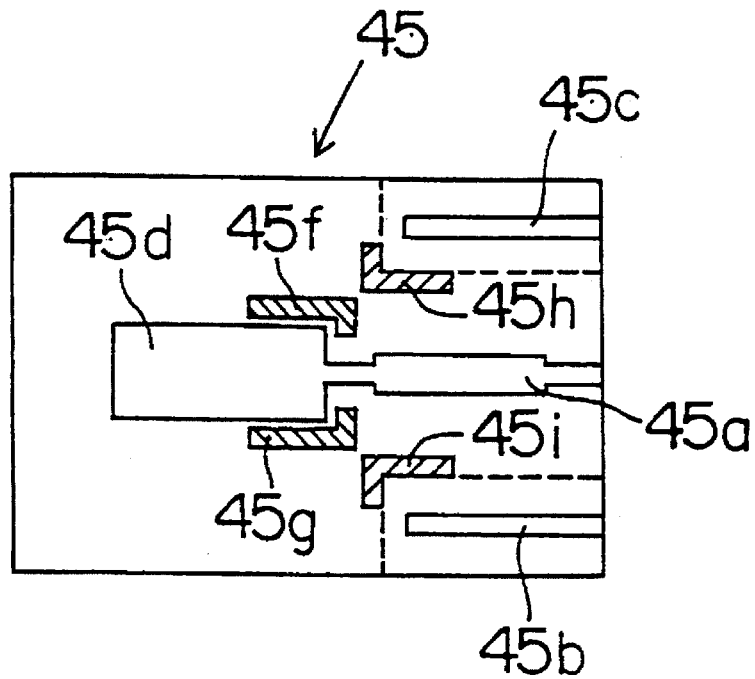
FIGS. 34(A), and 34(B) are diagrams showing still another optical link module.
Figure 34B:
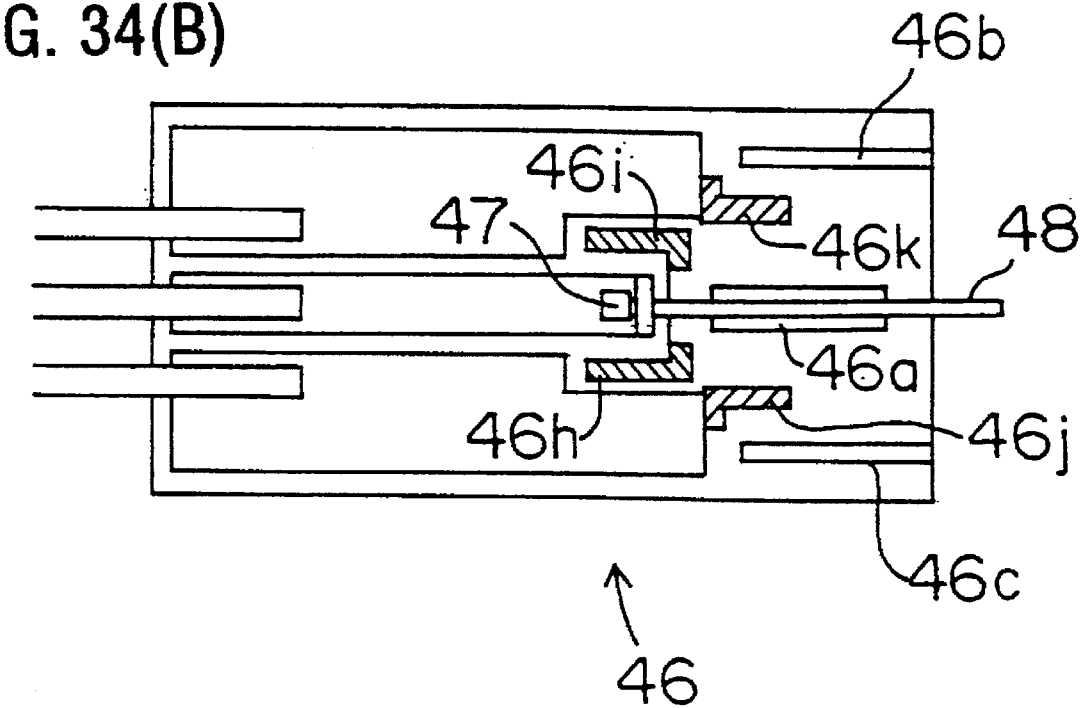

FIGS. 34(A) and 34(B) are plan views showing another structure of the upper and lower silicon substrates 45 and 46, respectively, which have been described as part of the optical link module 40 in the second embodiment but now have some additional features. Note again that the following discussion will not mention some elements described in the second embodiment, maintaining their consistent reference numerals.

The upper silicon substrate 45 has grooves 45f–45i that will serve as reservoirs to collect the overflowed adhesive when bonding the substrates 45 and 46 together. Specifically, the grooves 45f and 45g will prevent the adhesive from flowing into the cavity 45d, and the other grooves 45h and 45i will receive the overflows before they reach the V-grooves 45c and 45b, respectively.

Just similarly to the upper one, the lower silicon substrate 46 also has grooves 46h–46k for the same purposes. That is, those grooves are used for collecting the overflowed adhesive when bonding the substrates 45 and 46 together. The grooves 46h and 46i will protect the laser diode 47 from the adhesive, and the grooves 46j and 46k will guard the V-grooves 46c and 46b, respectively.

Those additional grooves will work enough, even if they are provided on either one of the silicon substrates 45 and 46.

Note that the first embodiment can also receive the same benefit by applying the above-described grooves to its silicon substrates for collecting the adhesive.

Figure 35:
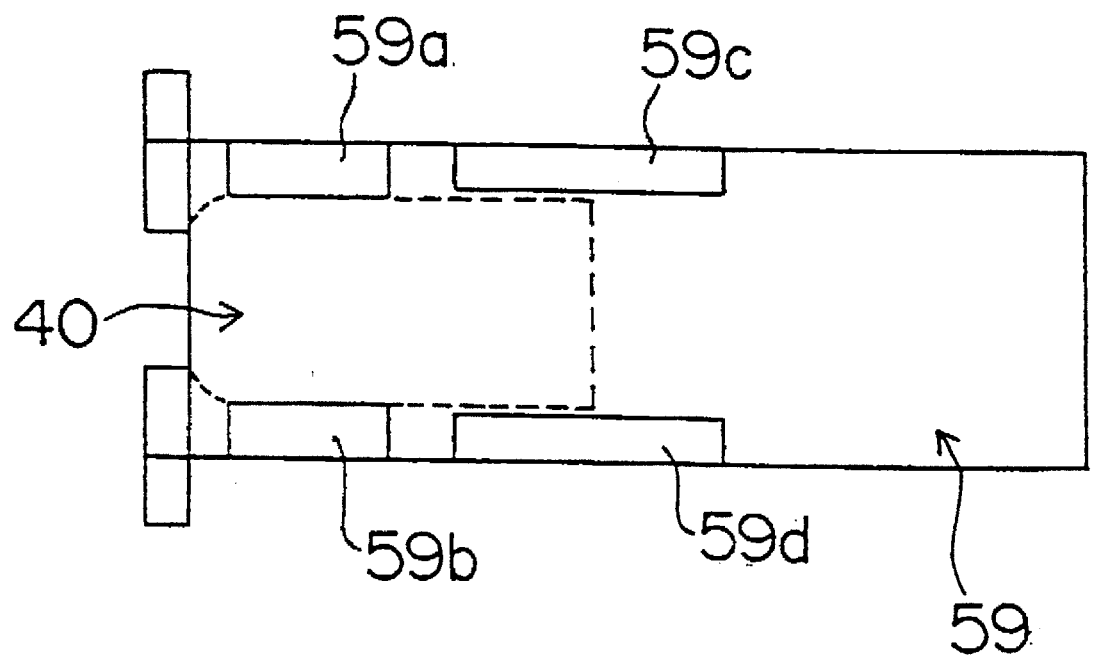
FIG. 35 is a plan view showing another housing.

FIG. 35 is a plan view showing another structure of housing as a variation of the housing 41 in the second embodiment. Note that the following discussion may leave out the well-known elements bearing the consistent reference numerals.

A housing 59 has a first pair of guide walls 59a and 59b and a second pair of guide walls 59c and 59d. The distance between the first guide walls 59a and 59b is slightly narrower than the width of the optical link module 40, and that of the second guide walls 59c and 59d is slightly wider than the width of the terminal 42. With such distance settings, the optical link module 40 can be press-fitted into the narrow space between the first guide walls 59a and 59b, and the terminal 42 can be smoothly plugged into the optical link module 40, led by the second guide walls 59c and 59d.

Unlike the second embodiment, this optical link module 40 does not require a heat crimping process to be applied to the underside, and the module will be crimped at the top side instead (details not shown). This certainly is an improvement of the assembly process, since every assembly operation can be performed from one side and there is no need to flip the component over during the process.

Figure 36:
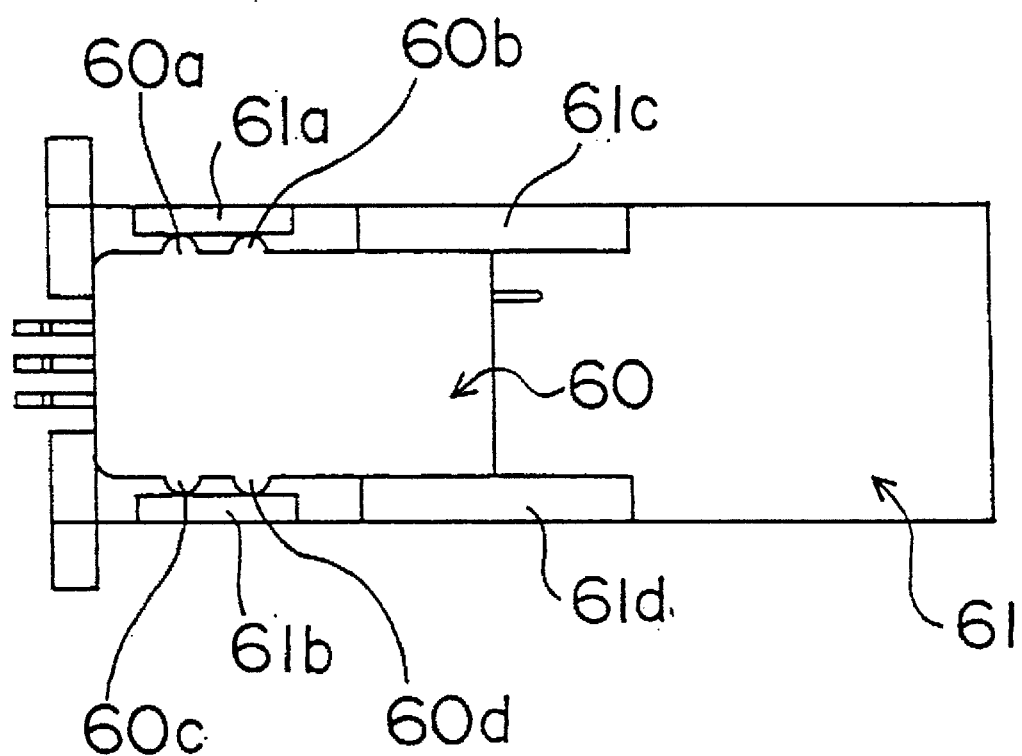
FIG. 36 is a plan view showing still another optical link module.

FIG. 36 is a plan view showing the structure of another type of optical link module and housing that are different from the optical link module 40 and housing 41 in the second embodiment.

An optical link module 60 has four projections 60a–60d, while a housing 61 has first guide walls 61a and 61b and second guide walls 61c and 61d. The distance between the first guide walls 61a and 61b is set slightly wider than that of the second guide walls 61c and 61d.

The optical link module 60 can be press-fitted into the space between the first guide walls 61a and 61b, deforming the tips of the projections 60a–60d.

This optical link module 60 requires no heat crimping process applied to its underside unlike the second embodiment, and the module will be crimped at the top side instead. This brings an improvement of the assembly process, since every assembly operation can be performed only from one side.

Figure 37:
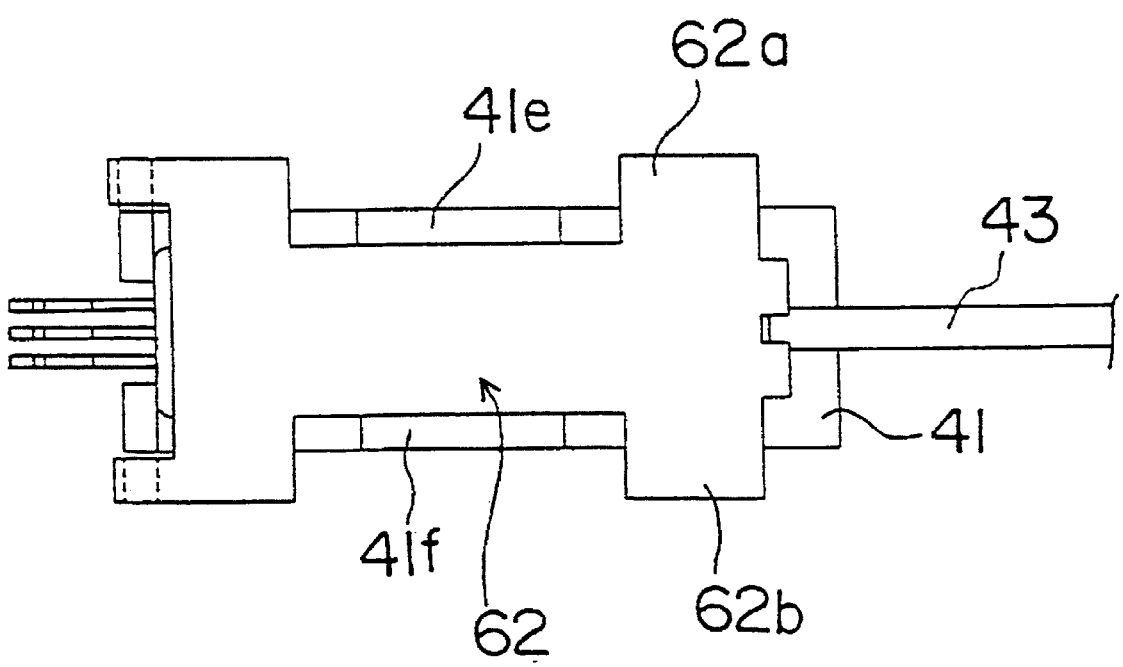
FIG. 37 is a plan view showing another type of metal plate spring.
Figure 38A:
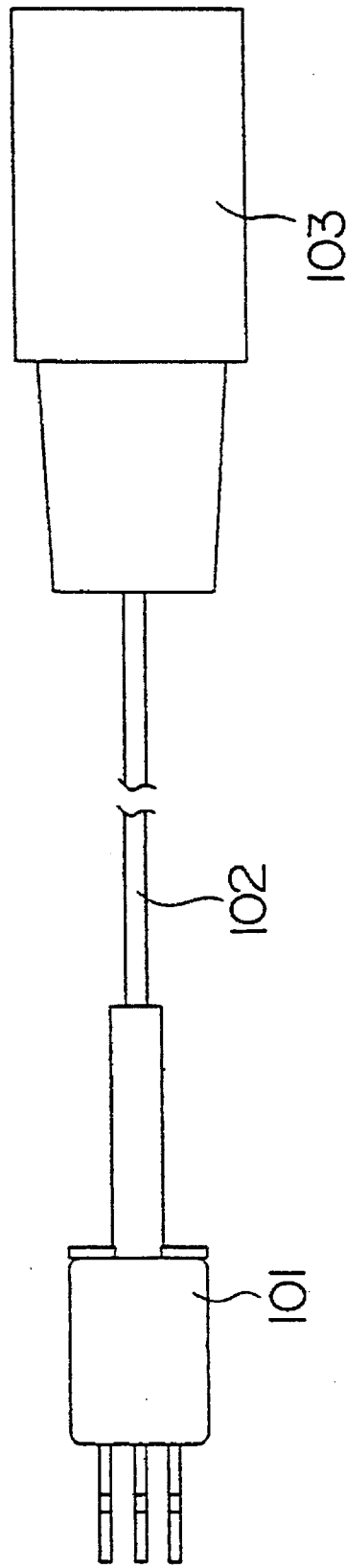
FIGS. 38(A) and 38(B) are diagrams showing the structure of a conventional optical link module.
Figure 38B:
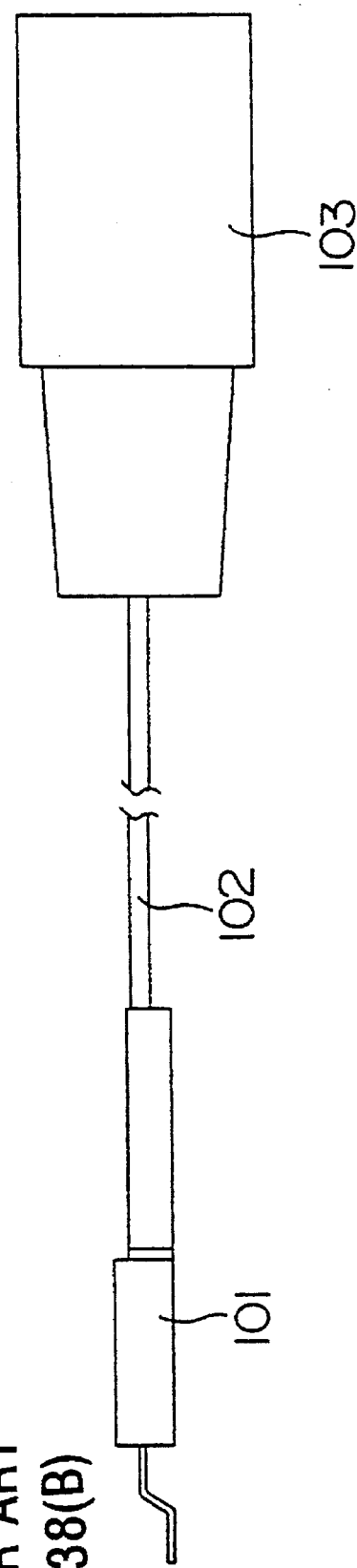
Figure 39A:
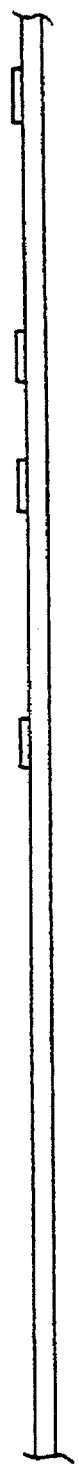
FIGS. 39(A) to 39 (E) are diagrams showing a soldering procedure.
Figure 39B:
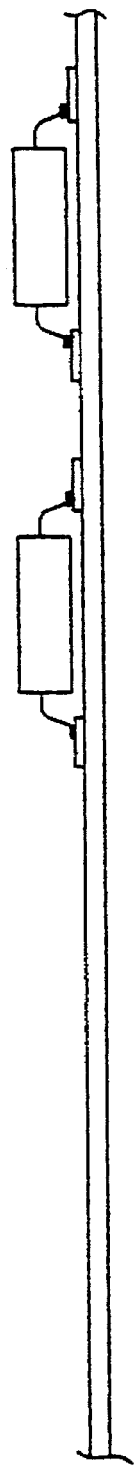
Figure 39C:
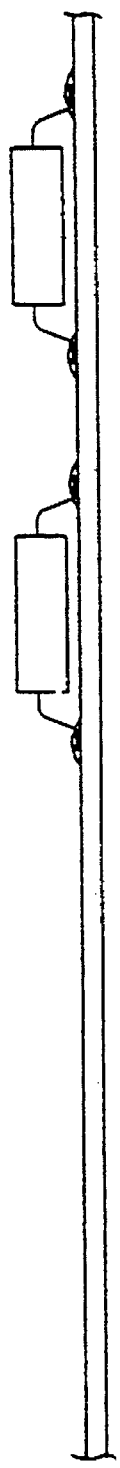
Figure 39D:
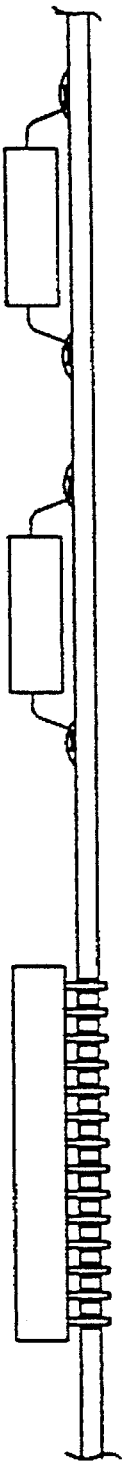
Figure 39E:
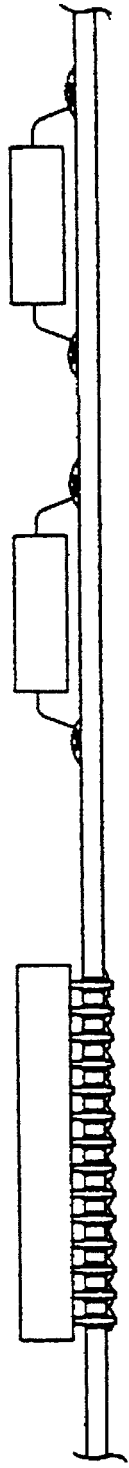
Figure 40A:
FIGS. 40(A) and 40(B) are diagrams showing a procedure of manual soldering of the optical link module.
Figure 40B:
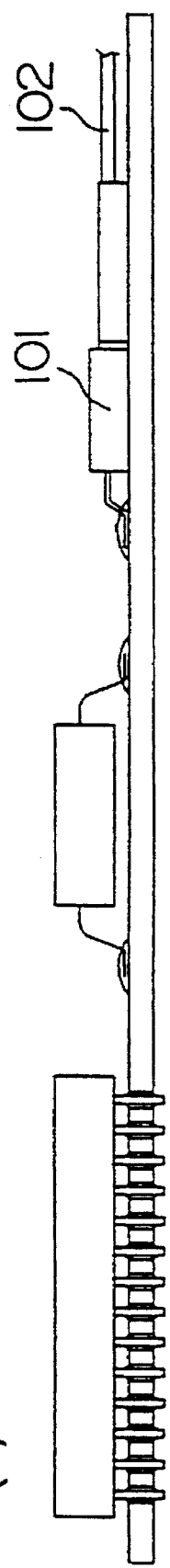
Figure 41:
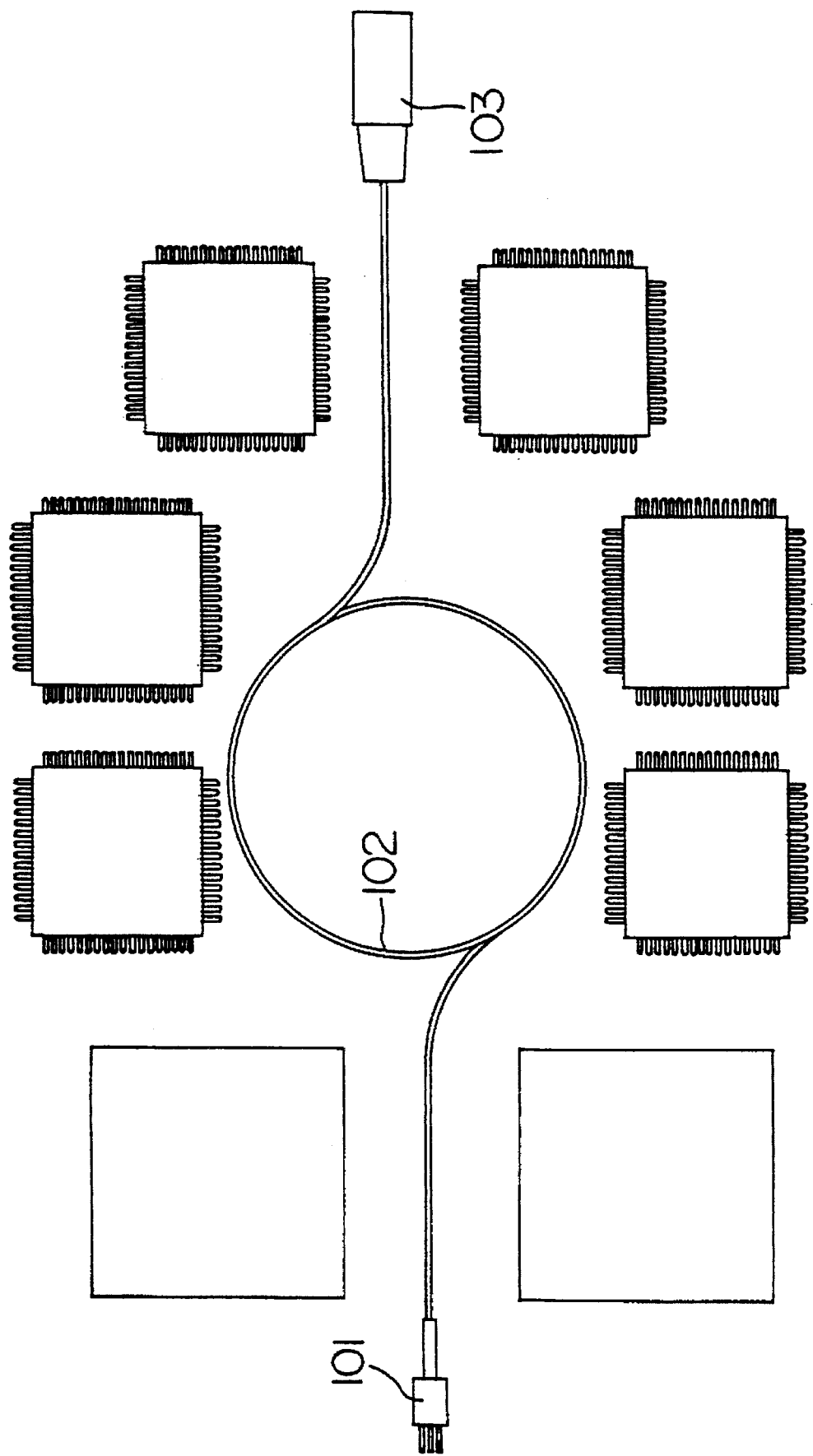
FIG. 41 is a diagram showing how to route the optical fiber extended from the optical link module.

FIG. 37 is a plan view showing another type of metal plate spring different from the metal plate spring 53 used in the second embodiment. The following explanation will not mention the well-known elements, maintaining their consistent reference numerals.

A metal plate spring 62 has wings 62a and 62b that provides a portion wider than the main body. This wide portion will ease handling of the metal plate spring 62 to lock and/or unlock the terminal 42.

The above description will be summarized as follows.

First, according to the present invention, a terminal is used to connect between an optical fiber and optical link module. Because the optical fiber with a non heat-resistant coating is made detachable, it is possible to apply an automated soldering process to the PC board assembly, thus resulting in a great reduction of its manufacturing cost.

Secondly, since the present invention eliminates the adjustment of the optical axis alignment between the optical fiber and optical link module, the extra length of the optical fiber is no longer required. This solves the problems in the shop floor concerning the storage space and handling of the optical fibers. In addition, it improves the space utilization factor of PC boards, enabling more components to be mounted thereon.

Thirdly, while it is still necessary to adjust the optical axis alignment when assembling the terminal with the optical fiber, any inferior product having an intolerable misalignment would be just scrapped, though it contains the terminal, optical fiber and standard connector. Because the conventional products contained an expensive optical link module, that kind of scrapping was not practical, but a reformation of optical fiber was required instead. In contrast to this, since the products according to the present invention never include such a costly device, it is possible to scrap the inferior products without concerning their expense.

Lastly, the optical link module design of the present invention is intended to reduce the module cost by using economical silicon substrates for packaging. Further, at many of the manufacturing steps to produce the optical link module and terminal, a number of pieces can be processed at a time in the form of a single silicon wafer, thus allowing a volume production. Use of standard semiconductor manufacturing equipment will also reduce to the cost of production facilities. Those advantages will make it possible to provide optical link modules at drastically lower prices than any other conventional products, and the economics of scale in manufacturing will promise a further cost reduction.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical link module connection system for connecting an optical fiber to an optical link module which performs conversion between an optical signal and an electrical signal, comprising:

optoelectronic conversion means for performing an optoelectronic conversion, having a first ferrule with a first optical fiber packaged therein;

coupling means, located at one end of a second optical fiber and having a second ferrule to package the second optical fiber therein, for optically coupling said second optical fiber with said first optical fiber by locating an endface of said second ferrule opposite to an endface of said first ferrule; and a standard optical fiber connector assembled at the other end of said second optical fiber.

2. An optical link module connection system according to claim 1 wherein said optoelectronic conversion means comprises:

a first silicon substrate having a cavity to house said first ferrule and an optoelectronic conversion element that performs the conversion between the optical signal and the electrical signal; and a second silicon substrate bonded to said first silicon substrate with a thermosetting resin, holding said optoelectronic conversion element and said first ferrule between said first silicon substrate and said second silicon substrate.

3. An optical link module connection system according to claim 2, wherein said first silicon substrate and/or said second silicon substrate has a groove prepared for receiving an excess of said thermosetting resin.

4. An optical link module connection system according to claim 2, wherein said first silicon substrate and/or said second silicon substrate has a rough surface to which said thermosetting resin is applied.

5. An optical link module connection system according to claim 2, wherein said first silicon substrate has a fiber stopper groove for positioning said first optical fiber in an axial direction thereof, said first silicon substrate is produced as a piece divided from a silicon wafer on which a plurality of pieces having an identical shape are fabricated, and said fiber stopper groove is processed on the silicon wafer before division of the pieces, by grooving across the plurality of pieces for said first silicon substrate.

6. An optical link module connection system according to claim 1, wherein said optoelectronic conversion means comprises:

a first silicon substrate having a cavity to house said first ferrule and an optoelectronic conversion element that performs the conversion between the optical signal and the electrical signal; and a second silicon substrate bonded to said first silicon substrate with solder, holding said optoelectronic conversion element and said first ferrule between said first silicon substrate and said second silicon substrate.

7. An optical link module connection system according to claim 1, wherein said optoelectronic conversion means comprises:

a first silicon substrate having a cavity to house said first ferrule and an optoelectronic conversion element that performs the conversion between the optical signal and the electrical signal;

a second silicon substrate bonded to said first silicon substrate, holding said optoelectronic conversion element and said first ferrule between said first silicon substrate and said second silicon substrate; and a flange, provided for said first ferrule of said optoelectronic conversion means, contacting an end of said first silicon substrate.

8. An optical link module connection system according to claim 1, wherein said coupling means comprises:

split sleeve holding an end of said second ferrule;

elasticity means, provided at the other end of said second ferrule, for pressing said second ferrule; and a cylindrical housing for housing said second ferrule, said split sleeve, and said elasticity means.

9. An optical link module connection system according to claim 1, wherein said optoelectronic conversion means has a metal plate spring that pivots upon an end thereof and is equipped at the other end with a stopping member for preventing said coupling means from moving away from said optoelectronic conversion means when said coupling means is joined to said optoelectronic conversion means.

10. An optical link module connection system for connecting an optical fiber to an optical link module which performs conversion between an optical signal and an electrical signal, comprising:

optoelectronic conversion means for performing an optoelectronic conversion, having a first interface surface on which a first endface of a first optical fiber is exposed;

coupling means, provided at an end of a second optical fiber, for providing an optical path between said second optical fiber and said first optical fiber, said coupling means having a second interface surface facing said first interface surface, on which a second endface of said second optical fiber is exposed and positioning means, provided on said second interface surface, for locating said second interface surface so that said second endface will face said first endface; and a standard optical fiber connector assembled at the other end of said second optical fiber.

11. An optical link module connection system according to claim 10, wherein said optoelectronic conversion means comprises:

a first silicon substrate having a cavity to house said first optical fiber and an optoelectronic conversion element that performs the conversion between the optical signal and the electrical signal; and a second silicon substrate bonded to said first silicon substrate with a thermosetting resin, holding said optoelectronic conversion element and said first optical fiber between said first silicon substrate and said second silicon substrate.

12. An optical link module connection system according to claim 11, wherein said first silicon substrate and/or said second silicon substrate has a groove prepared for receiving an excess of said thermosetting resin.

13. An optical link module connection system according to claim 12, wherein said first silicon substrate and/or said second silicon substrate has a rough surface to which said thermosetting resin is applied.

14. An optical link module connection system according to claim 11, wherein said first silicon substrate has a fiber stopper groove for positioning said first optical fiber in an axial direction thereof, said first silicon substrate is produced as a piece divided from a silicon wafer on which a plurality of pieces having an identical shape are fabricated, and said fiber stopper groove is processed on the silicon wafer before division of the pieces, by grooving across the plurality of pieces for said first silicon substrate.

15. An optical link module connection system according to claim 10, wherein said optoelectronic conversion means comprises:

a first silicon substrate having a cavity to house said first optical fiber and an optoelectronic conversion element that performs the conversion between the optical signal and the electrical signal; and a second silicon substrate bonded to said first silicon substrate with solder, holding said optoelectronic conversion element and said first optical fiber between said first silicon substrate and said second silicon substrate.

16. An optical link module connection system according to claim 10, wherein said coupling means comprises:

a third silicon substrate having a cavity to house said second optical fiber and said positioning means; and a fourth silicon substrate bonded to said third silicon substrate, holding said second optical fiber and said positioning means between said third silicon substrate and said fourth silicon substrate.

17. An optical link module connection system according to claim 10, wherein said optoelectronic conversion means has a metal plate spring that pivots upon an end thereof and is equipped at the other end with a stopping member for preventing said coupling means from moving away from said optoelectronic conversion means when said coupling means is joined to said optoelectronic conversion means.

* * * * *